(12) United States Patent
Takahashi et al.

(10) Patent No.: US 7,248,012 B2
(45) Date of Patent: Jul. 24, 2007

(54) TEACHING DATA PREPARING METHOD FOR ARTICULATED ROBOT

(75) Inventors: Koji Takahashi, Utsunomiya (JP); Shinji Aoki, Saitama (JP); Yutaka Mitsuhashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/558,641

(22) PCT Filed: Jun. 2, 2004

(86) PCT No.: PCT/JP2004/007627

§ 371 (c)(1),
(2), (4) Date: Nov. 30, 2005

(87) PCT Pub. No.: WO2004/108365

PCT Pub. Date: Dec. 16, 2004

(65) Prior Publication Data

US 2006/0255758 A1    Nov. 16, 2006

(30) Foreign Application Priority Data

Jun. 2, 2003    (JP) .............................. 2003-156239
Jun. 3, 2003    (JP) .............................. 2003-158254

(51) Int. Cl.
    *B25J 9/22*    (2006.01)
(52) U.S. Cl. ............ 318/568.13; 318/573; 318/568.15; 318/569; 700/252; 700/245; 700/262
(58) Field of Classification Search ........ 318/567–569, 318/615; 700/186, 187, 245, 262
    See application file for complete search history.

(56) References Cited

U.S. PATENT DOCUMENTS

| | | | | |
|---|---|---|---|---|
| 4,263,538 | A * | 4/1981 | Richiardi | ............... 318/568.14 |
| 4,338,672 | A * | 7/1982 | Perzley et al. | .............. 700/249 |
| 4,528,632 | A * | 7/1985 | Nio et al. | ................... 700/189 |
| 4,541,060 | A * | 9/1985 | Kogawa | ..................... 700/252 |
| 4,550,383 | A * | 10/1985 | Sugimoto | ................... 700/262 |
| 4,621,333 | A * | 11/1986 | Watanabe | ................... 700/257 |

(Continued)

FOREIGN PATENT DOCUMENTS

JP    10-063322    3/1998

(Continued)

*Primary Examiner*—Paul Ip
(74) *Attorney, Agent, or Firm*—Arent Fox, LLP.

(57) ABSTRACT

Set the first temporary attitude of an end effector for a plurality of work points (step S3). Determine the attitude of an articulated robot at one-end first work point out of a plurality of work points (step S4). Determine the attitude of an articulated robot at the other-end final work point out of a plurality of work points (step S5). Set the second temporary attitudes of an end effector respectively for the other work points so that the attitude of an end effector gradually changes from the first work point toward the final work point (step S6). Correct the first temporary attitude with the second temporary attitude (step S7).

14 Claims, 30 Drawing Sheets

U.S. PATENT DOCUMENTS

| | | | |
|---|---|---|---|
| 4,648,024 A * | 3/1987 | Kato et al. | 700/187 |
| 4,728,872 A * | 3/1988 | Kishi et al. | 318/568.18 |
| 4,821,207 A * | 4/1989 | Ming et al. | 700/252 |
| 4,823,279 A * | 4/1989 | Perzley et al. | 700/251 |
| 4,841,430 A * | 6/1989 | Nakagawa et al. | 700/64 |
| 4,879,663 A * | 11/1989 | Fuehrer | 700/250 |
| 4,903,213 A * | 2/1990 | Buhler et al. | 700/189 |
| 5,028,855 A * | 7/1991 | Distler et al. | 700/187 |
| 5,070,287 A * | 12/1991 | Boehm | 318/569 |
| 5,073,748 A * | 12/1991 | Boehm | 318/569 |
| 5,204,599 A * | 4/1993 | Hohn | 318/571 |
| 5,229,698 A * | 7/1993 | Minnich et al. | 318/568.15 |
| 5,276,383 A * | 1/1994 | Nishimura et al. | 318/568.15 |
| 5,287,049 A * | 2/1994 | Olomski et al. | 318/568.1 |
| 5,303,333 A * | 4/1994 | Hoos | 700/245 |
| 5,373,221 A * | 12/1994 | McGee et al. | 318/568.11 |
| 5,394,513 A * | 2/1995 | Sgarbi et al. | 700/245 |
| 5,396,160 A * | 3/1995 | Chen | 318/573 |
| 5,434,489 A * | 7/1995 | Cheng et al. | 318/568.15 |
| 5,731,820 A * | 3/1998 | Broekhuijsen | 345/442 |
| 5,740,327 A * | 4/1998 | Funaya | 700/254 |
| 5,920,679 A * | 7/1999 | Ge et al. | 700/262 |
| 5,993,044 A * | 11/1999 | Ohto et al. | 700/262 |
| 6,114,825 A * | 9/2000 | Katz | 318/615 |
| 6,140,787 A * | 10/2000 | Lokhorst et al. | 318/568.18 |
| 6,169,981 B1 * | 1/2001 | Werbos | 706/23 |
| 6,401,006 B1 * | 6/2002 | Mizuno et al. | 700/189 |
| 6,408,224 B1 * | 6/2002 | Okamoto et al. | 700/245 |
| 6,430,472 B1 * | 8/2002 | Boillot et al. | 700/245 |
| 6,748,300 B2 * | 6/2004 | Sato | 700/304 |
| 6,895,299 B2 * | 5/2005 | Red et al. | 700/186 |
| 6,922,606 B1 * | 7/2005 | Yutkowitz | 700/187 |
| 2002/0013675 A1 * | 1/2002 | Knoll et al. | 702/150 |
| 2004/0138779 A1 | 7/2004 | Shibata et al. | |

FOREIGN PATENT DOCUMENTS

| | | |
|---|---|---|
| JP | 2002-239955 | 8/2002 |
| JP | 2002-239957 | 8/2002 |
| JP | 2003-053539 | 2/2003 |
| JP | 2003-094363 | 4/2003 |
| JP | 2003-117864 | 4/2003 |

* cited by examiner

FIG. 6

| SEQUENCE | NO. | TOOL COORDINATE DATA ||||||| AXIS ANGLE ||||||
| | | TCP POSITION ||| END EFFECTOR ORIENTATION ||| | | | | | |
| | | X | Y | Z | Xr | Yr | Zr | θ1 | θ2 | θ3 | θ4 | θ5 | θ6 |
|---|---|---|---|---|---|---|---|---|---|---|---|---|---|
| 1 | P0 | X0 | Y0 | Z0 | Xr0 | Yr0 | Zr0 | θ10 | θ20 | θ30 | θ40 | θ50 | θ60 |
| 2 | P1 | X1 | Y1 | Z1 | Xr1 | Yr1 | Zr1 | θ11 | θ21 | θ31 | θ41 | θ51 | θ61 |
| 3 | P2 | X2 | Y2 | Z2 | Xr2 | Yr2 | Zr2 | θ12 | θ22 | θ32 | θ42 | θ52 | θ62 |
| 4 | P3 | X3 | Y3 | Z3 | Xr3 | Yr3 | Zr3 | θ13 | θ23 | θ33 | θ43 | θ53 | θ63 |
| 5 | P4 | X4 | Y4 | Z4 | Xr4 | Yr4 | Zr4 | θ14 | θ24 | θ34 | θ44 | θ54 | θ64 |
| 6 | P5 | X5 | Y5 | Z5 | Xr5 | Yr5 | Zr5 | θ15 | θ25 | θ35 | θ45 | θ55 | θ65 |
| 7 | P6 | X6 | Y6 | Z6 | Xr6 | Yr6 | Zr6 | θ16 | θ26 | θ36 | θ46 | θ56 | θ66 |
| 8 | P7 | X7 | Y7 | Z7 | Xr7 | Yr7 | Zr7 | θ17 | θ27 | θ37 | θ47 | θ57 | θ67 |
| ... | ... | ... | ... | ... | ... | ... | ... | ... | ... | ... | ... | ... | ... |
| ... | Pe | Xe | Ye | Ze | Xre | Yre | Zre | θ1e | θ2e | θ3e | θ4e | θ5e | θ6e |
| ... | P0 | X0 | Y0 | Z0 | Xr0 | Yr0 | Zr0 | θ10 | θ20 | θ30 | θ40 | θ50 | θ60 |
| ... | ... | ... | ... | ... | ... | ... | ... | ... | ... | ... | ... | ... | ... |

| SEQUENCE NO. | | TOOL COORDINATE DATA | | | | | | AXIS ANGLE | | | | | | | |
|---|---|---|---|---|---|---|---|---|---|---|---|---|---|---|---|
| | | TCP POSITION | END EFFECTOR ORIENTATION | | | ENTRY DIRECTION | θ1 | θ2 | θ3 | θ4 | REVOLUTION | θ5 | θ6 | REVOLUTION |
| | | | Xr | Yr | Zr | | | | | | | | | | |
| 1 | T01 | A0 | T01X | T01Y | T01Z | – | T01θ1 | T01θ2 | T01θ3 | T01θ4 | 0 | T01θ5 | T01θ6 | 0 |
| 2 | P1 | A1 | XP1 | YP1 | ZP1 | C1 | θP11 | θP21 | θP31 | θP41 | 0 | θP51 | θP61 | 0 |
| 3 | P2 | A2 | XP2 | YP2 | ZP2 | C2 | θP12 | θP22 | θP32 | θP42 | 1 | θP52 | θP62 | 1 |
| 4 | P3 | A3 | XP3 | YP3 | ZP3 | C3 | θP13 | θP23 | θP33 | θP43 | 0 | θP53 | θP63 | 0 |
| 5 | P4 | A4 | XP4 | YP4 | ZP4 | C4 | θP14 | θP24 | θP34 | θP44 | 0 | θP54 | θP64 | 0 |
| 6 | P5 | A5 | XP5 | YP5 | ZP5 | C5 | θP15 | θP25 | θP35 | θP45 | 1 | θP55 | θP65 | 1 |
| 7 | P6 | A6 | XP6 | YP6 | ZP6 | C6 | θP16 | θP26 | θP36 | θP46 | 0 | θP56 | θP66 | 0 |
| 8 | P7 | A7 | XP7 | YP7 | ZP7 | C7 | θP17 | θP27 | θP37 | θP47 | 1 | θP57 | θP67 | 1 |
| 9 | T02 | A8 | T02X | T02Y | T02Z | – | T02θ1 | T02θ2 | T02θ3 | T02θ4 | 1 | T02θ5 | T02θ6 | 1 |
| 10 | T03 | A9 | T03X | T03Y | T03Z | – | T03θ1 | T03θ2 | T03θ3 | T03θ4 | 1 | T03θ5 | T03θ6 | 1 |
| 11 | | | | | | | | | | | | | | |
| 12 | | | | | | | | | | | | | | |
| 13 | | | | | | | | | | | | | | |

<table>
<tr><th rowspan="3">SEQUENCE NO.</th><th colspan="4">TOOL COORDINATE DATA</th><th colspan="7">AXIS ANGLE</th></tr>
<tr><th rowspan="2">TCP POSITION</th><th colspan="3">END EFFECTOR ORIENTATION</th><th rowspan="2">ENTRY DIRECTION</th><th rowspan="2">θ1</th><th rowspan="2">θ2</th><th rowspan="2">θ3</th><th rowspan="2">θ4</th><th rowspan="2">REVOLUTION</th><th rowspan="2">θ5</th><th rowspan="2">θ6</th><th rowspan="2">REVOLUTION</th></tr>
<tr><th>Xr</th><th>Yr</th><th>Zr</th></tr>
<tr><td>1</td><td>T11</td><td>B0</td><td>T11X</td><td>T11Y</td><td>T11Z</td><td>―</td><td>T11θ1</td><td>T11θ2</td><td>T11θ3</td><td>T11θ4</td><td>0</td><td>T11θ5</td><td>T11θ6</td><td>0</td></tr>
<tr><td>2</td><td>Q1</td><td>B1</td><td>XQ1</td><td>YQ1</td><td>ZQ1</td><td>D1</td><td>θQ11</td><td>θQ21</td><td>θQ31</td><td>θQ41</td><td>0</td><td>θQ51</td><td>θQ61</td><td>0</td></tr>
<tr><td>3</td><td>Q2</td><td>B2</td><td>XQ2</td><td>YQ2</td><td>ZQ2</td><td>D2</td><td>θQ12</td><td>θQ22</td><td>θQ32</td><td>θQ42</td><td>1</td><td>θQ52</td><td>θQ62</td><td>1</td></tr>
<tr><td>4</td><td>Q3</td><td>B3</td><td>XQ3</td><td>YQ3</td><td>ZQ3</td><td>D3</td><td>θQ13</td><td>θQ23</td><td>θQ33</td><td>θQ43</td><td>0</td><td>θQ53</td><td>θQ63</td><td>0</td></tr>
<tr><td>5</td><td>Q4</td><td>B4</td><td>XQ4</td><td>YQ4</td><td>ZQ4</td><td>D4</td><td>θQ14</td><td>θQ24</td><td>θQ34</td><td>θQ44</td><td>0</td><td>θQ54</td><td>θQ64</td><td>0</td></tr>
<tr><td>6</td><td>Q5</td><td>B5</td><td>XQ5</td><td>YQ5</td><td>ZQ5</td><td>D5</td><td>θQ15</td><td>θQ25</td><td>θQ35</td><td>θQ45</td><td>1</td><td>θQ55</td><td>θQ65</td><td>1</td></tr>
<tr><td>7</td><td>Q6</td><td>B6</td><td>XQ6</td><td>YQ6</td><td>ZQ6</td><td>D6</td><td>θQ16</td><td>θQ26</td><td>θQ36</td><td>θQ46</td><td>0</td><td>θQ56</td><td>θQ66</td><td>0</td></tr>
<tr><td>8</td><td>Q7</td><td>B7</td><td>XQ7</td><td>YQ7</td><td>ZQ7</td><td>D7</td><td>θQ17</td><td>θQ27</td><td>θQ37</td><td>θQ47</td><td>1</td><td>θQ57</td><td>θQ67</td><td>1</td></tr>
<tr><td>9</td><td>Q8</td><td>B8</td><td>XQ8</td><td>YQ8</td><td>ZQ8</td><td>D8</td><td>θQ18</td><td>θQ28</td><td>θQ38</td><td>θQ48</td><td>1</td><td>θQ58</td><td>θQ68</td><td>1</td></tr>
<tr><td>10</td><td>Q9</td><td>B9</td><td>XQ9</td><td>YQ9</td><td>ZQ9</td><td>D9</td><td>θQ19</td><td>θQ29</td><td>θQ39</td><td>θQ49</td><td>1</td><td>θQ59</td><td>θQ69</td><td>1</td></tr>
<tr><td>11</td><td>T12</td><td>B10</td><td>T12X</td><td>T12Y</td><td>T12Z</td><td>―</td><td>T12θ1</td><td>T12θ2</td><td>T12θ3</td><td>T12θ4</td><td>1</td><td>T12θ5</td><td>T12θ6</td><td>1</td></tr>
<tr><td>12</td><td>T03</td><td>B11</td><td>T03X</td><td>T03Y</td><td>T03Z</td><td>―</td><td>T03θ1</td><td>T03θ2</td><td>T03θ3</td><td>T03θ4</td><td>1</td><td>T03θ5</td><td>T03θ6</td><td>1</td></tr>
<tr><td>13</td><td></td><td></td><td></td><td></td><td></td><td></td><td></td><td></td><td></td><td></td><td></td><td></td><td></td><td></td></tr>
</table>

160

TEACHING DATA PREPARING METHOD FOR ARTICULATED ROBOT

CROSS-REFERENCE TO RELATED APPLICATION

This application is a National Stage entry of International Application No. PCT/JP2004/007627, filed Jun. 2, 2004, the entire specification claims and drawings of which are incorporated herewith by reference.

TECHNICAL FIELD

The present invention relates to a method of generating teaching data for an articulated robot, which has an end effector, for successively working on a plurality of successive working points with the end effector.

BACKGROUND ART

For directly operating an articulated robot installed on a production line to teach the articulated robot working attitudes, the operator who is familiar with operating the articulated robot needs to work at the site of the production line. Therefore, the working time is limited and the operation is inefficient. Since it is necessary to perform the teaching process while the production line is being shut off, the operating rate of the production line is reduced.

In recent years, teaching off line (off-line teaching) has been practiced in order to perform the teaching process efficiently or increase the operating rate of the production line. Specifically, a model of an articulated robot, a workpiece to be worked and surrounding structures is constructed on a computer, and teaching data is generated using the model. Thereafter, the teaching data is supplied to the articulated robot on site. In this manner, it is possible to generate teaching data efficiently without shutting off the production line.

Production lines have been required to increase their productivity. To meet the requirement, attempts are made to shorten the cycle time of articulated robots. Under the circumstances, there has been proposed a technology for calculating attitudes of an articulated robot at respective working points in a working sequence, selecting attitudes of the articulated robot for short moving times and reduced end effector attitude differences, thereafter calculating an attitude of the articulated robot at a final working point in a reverse working sequence, and comparing the calculated attitude of the articulated robot at the final working point with the attitude of the articulated robot at a final working point in the working sequence, and correcting the calculated attitude of the articulated robot (see, for example, Japanese Laid-Open Patent Publication No. 2003-94363). The proposed technology is preferable because it can shorten the cycle time of operation of the articulated robot for increased productivity.

There has also been proposed a method of automatically setting the insertion path and attitude of an end effector with respect to a workpiece for generating teaching data for the articulated robot (see, for example, Japanese Laid-Open Patent Publication No. 2002-239955 and Japanese Laid-Open Patent Publication No. 2002-239957).

According to the process disclosed in Japanese Laid-Open Patent Publication No. 2003-94363, since teaching data is established mainly for the purpose of reducing the end effector attitude differences, the moving path between working points for the end effector may not be smooth. When the end effector works successively on the successive working points, the time to apply the end effector to the first working point and the time to remove the end effector from the final working point are not sufficiently taken into account. As a result, the overall cycle time may be increased, and the operator may need to correct the teaching data on a trial-and-error basis.

Teaching data is generated by establishing working points and a working sequence of an articulated robot with respect to a workpiece, determining robot attitudes at the respective working points, then establishing working details for the workpiece at the respective working points as working attributes, and establishing moving processes between the working points as moving attributes. Data of the robot attitudes at the working points occasionally includes tool coordinate data representative of the attitudes of an end effector mounted on the tip end of the robot.

Off-line teaching does not require the production line to be shut off. If off-line teaching is performed inefficiently, however, it is necessary to use the teaching computer for a long period of time, and a large burden is posed on the operator who performs the teaching process. An articulated robot to be trained is positioned in the vicinity of a given conveyor line for welding vehicles that are conveyed on the conveyor line. However, the vehicles conveyed on the conveyor line may not be limited to one type. When the type of vehicles to be processed by the articulated robot is to be changed, new teaching data needs to be generated.

There has been proposed a technology applicable where there is existing teaching data. According to the proposed technology, if the existing teaching data includes data that can be used on a preferential basis to provide an attitude for a new working point, the data is utilized (see, for example, Japanese Laid-Open Patent Publication No. 2003-117864). The proposed technology is preferable because new teaching data can be generated using existing teaching data.

According to the technology disclosed in Japanese Laid-Open Patent Publication No. 2003-117864, however, the portion of the existing teaching data that can be utilized as new teaching data is limited, and the existing teaching data may not be utilized if workpieces change their shape. Under the circumstances, it has been desirous to further effectively utilize existing teaching data.

Patent document 1: Japanese Laid-Open Patent Publication No. 2003-94363

Patent document 2: Japanese Laid-Open Patent Publication No. 2002-239955

Patent document 3: Japanese Laid-Open Patent Publication No. 2002-239957

Patent document 4: Japanese Laid-Open Patent Publication No. 2003-117864

DISCLOSURE OF THE INVENTION

Problems to be Solved by the Invention

It is an object of the present invention to provide a method of generating teaching data for an articulated robot for smoothly moving the articulated robot to shorten an overall moving time thereof when an end effector thereof works successively on a plurality of successive working points.

Another object of the present invention is to provide a method of generating teaching data for an articulated robot by effectively utilizing existing teaching data with respect to an existing workpiece to efficiently generate teaching data with respect to another workpiece.

MEANS FOR SOLVING THE PROBLEMS

According to the present invention, there is provided a method of generating teaching data for an articulated robot, which has an end effector, for successively working on a plurality of successive working points with the end effector, comprising the first step of establishing first provisional attitudes of the end effector with respect to the working points, the second step of determining an attitude of the articulated robot at a first working point at an end of the working points, the third step of determining an attitude of the articulated robot at a final working point at the other end of the working points, the fourth step of establishing second provisional attitudes of the end effector with respect to other working points such that the attitude of the end effector of the articulated robot which is determined in the second step changes progressively to the attitude of the end effector of the articulated robot which is determined in the third step, and the fifth step of correcting the first provisional attitudes with the second provisional attitudes to establish attitudes of the end effector at the respective working points.

With this arrangement, when the end effector successively works on a plurality of successive working points, the articulated robot can be moved smoothly in a shortened working time.

The second step may determine the attitude of the articulated robot at the first working point in order for the end effector to reach the first working point within a shortest time from a teaching spot preceding the first working point.

The end effector can thus move quickly to the first working point, and can operate within a short time including a moving time before the end effector starts to work.

The third step may determine the attitude of the articulated robot at the final working point in order for the end effector to reach a teaching spot following the final working point within a shortest time from the final working point.

Therefore, after the end effector finishes its work at the final working point, the end effector can quickly be retracted from the final working point, and can operate within a short time including a moving time after the end effector finishes its work.

The fourth step may comprise the first substep of determining a difference between the attitudes of the end effector of the articulated robot which are determined respectively in the second step and the third step, and the second substep of establishing the second provisional attitudes by proportionally dividing the attitudes of the end effector of the articulated robot which are determined respectively in the second step and the third step, by a distance ratio of each of the working points from the first working point to a total path distance from the first working point to the final working point.

The fourth step may alternatively comprise the first substep of determining a difference between the attitudes of the end effector of the articulated robot which are determined respectively in the second step and the third step, the second substep of determining a proportionally divided attitude by proportionally dividing the attitudes of the end effector of the articulated robot which are determined respectively in the second step and the third step, by a distance ratio of each of the working points from the first working point to a total path distance from the first working point to the final working point, and the third substep of determining the attitudes of the end effector at the proportionally divided attitude as the second provisional attitudes.

The fourth step further alternatively comprise the first substep of recording the attitudes of the end effector at respective predetermined times while simulatively moving the end effector from the first working point to the final working point on the condition that the attitudes of the end effector at the first working point and the final working point become the attitudes determined respectively in the second step and the third step, and the second substep of selecting attitudes, which correspond to a moving time ratio, of the attitudes of the end effector recorded in the first sub step, based on a distance ratio of each of the working points from the first working point to a total path distance from the first working point to the final working point.

When the end effector is simulatively moved in the first sub step, the end effector may be is moved in a shortest time from the first working point to the final working point.

When the end effector is simulatively moved in the first sub step, the end effector may be moved straight from the first working point to the final working point.

By thus provisionally moving the end effector in a shortest time or moving the end effector straight, recording data, and determining the second provisional attitudes, the movement of the end effector from the first working point to the final working point may be made smooth.

The fifth step may replace at least one of a plurality of parameters representing the first provisional attitudes with parameters representing the second provisional attitudes.

The first step may establish the first provisional attitudes such that working members of the end effector face perpendicularly to a workpiece, and the fifth step may correct the first provisional attitudes to keep the working members facing perpendicularly to the workpiece.

According to the present invention, there is also provided a method of generating teaching data for an articulated robot to convert first teaching data for the articulated robot which correspond to a plurality of working points on a first workpiece into second teaching data for the articulated robot which correspond to a plurality of working points on a second workpiece, wherein the first teaching data and the second teaching data include tool coordinate data representing attitudes of an end effector of the articulated robot at the working points, the tool coordinate data comprising a plurality of parameters, and one of the parameters of the tool coordinate data of the second teaching data is established in advance, and the step of converting the tool coordinate data of the first teaching data into the tool coordinate data of the second teaching data so that one of the parameters of the tool coordinate data of the first teaching data matches the one established parameter of the second teaching data, is performed on the working points.

By thus converting the tool coordinate data at the working points of the first teaching data into the second teaching data and copying the second teaching data, the first teaching data can effectively be utilized to efficiently generate the second teaching data.

If the tool coordinate data of the first teaching data are converted by rotation into the tool coordinate data of the second teaching data, then the tool coordinate data of the first teaching data may be converted in their storage areas and rewritten, and thereafter may be transferred to the storage areas of the second teaching data, or the tool coordinate data of the first teaching data may be converted after they are transferred to the storage areas of the second teaching data. Alternatively, the tool coordinate data of the first teaching data may be transferred to a given buffer area, converted in the buffer area, and thereafter transferred to the storage areas of the second teaching data.

The first teaching data and the second teaching data may include entry direction data with respect to the working points, and the entry direction data may be copied from the first teaching data into the second teaching data at each of the working points.

The first teaching data and the second teaching data may include revolutionary information relative to a rotational angle of at least one joint, and the revolutionary information may be copied from the first teaching data into the second teaching data at each of the working points. Therefore, the cables of the articulated robot are prevented from being twisted, and corresponding axes are prevented from being excessively rotated between the working points.

The second teaching data may include first provisional working point data representative of a provisional point preceding a first working point of the working points and second provisional working point data representative of a provisional point following a final working point of the working points, the first provisional working point data may be established based on tool coordinate data at the first working point, and the second provisional working point data may be established based on tool coordinate data at the final working point.

BRIEF DESCRIPTION OF THE DRAWINGS

FIG. 6 is a diagram showing contents of a path table;

FIG. 22 is a diagram showing contents of the first teaching data;

FIG. 24 is a diagram showing contents of the second teaching data;

BEST MODE FOR CARRYING OUT THE INVENTION

Figure 1:
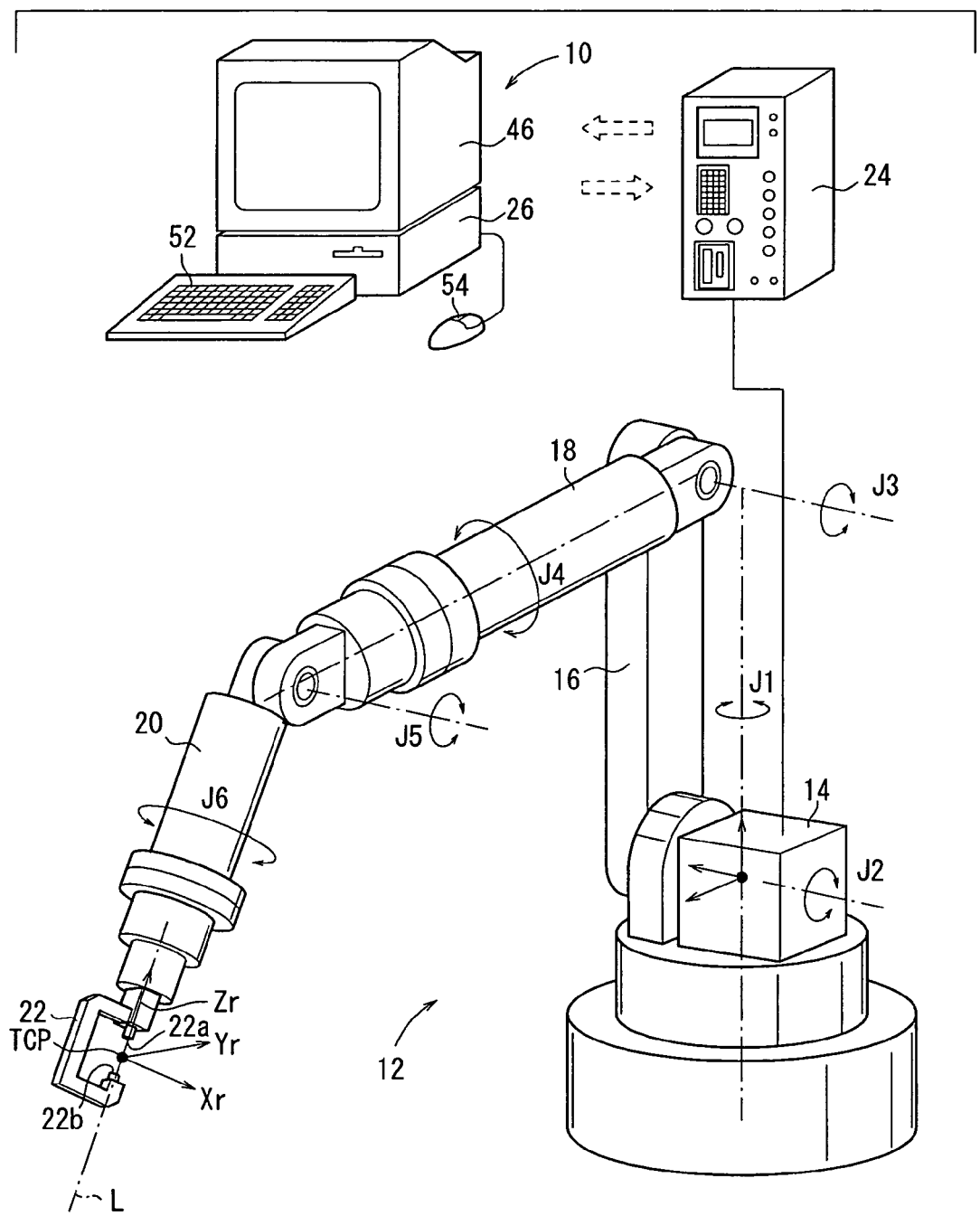
FIG. 1 is a view of a general arrangement of an off-line teaching apparatus according to the present embodiment and an articulated robot.

FIG. 1 shows an arrangement of an off-line teaching apparatus 10 to which a method of generating teaching data for an articulated robot according to the present embodiment is applied, and an articulated robot 12 to which teaching data generated by the off-line teaching apparatus 10 is applied.

The articulated robot 12 comprises an industrial articulated robot, and has a base 14, a first arm 16, a second arm 18, and a third arm 20 which are successively connected to the base 14 as a reference, and an end effector 22 comprising a welding gun mounted on the distal end of the third arm 20. The end effector 22 is removable from the third arm 20. The first arm 16 is angularly movable about axes J1, J2 for horizontal and vertical angular movement with respect to the base 14. The second arm 18 is angularly movably coupled to the first arm 16 by an axis J3. The second arm 18 is twistable about an axis J4. The third arm 20 is angularly movably coupled to the second arm 18 by an axis J5. The third arm 20 is twistable about an axis J6. Each of the axis J4 and the axis J6 allows twisting motion through 360° or more.

Figure 2:
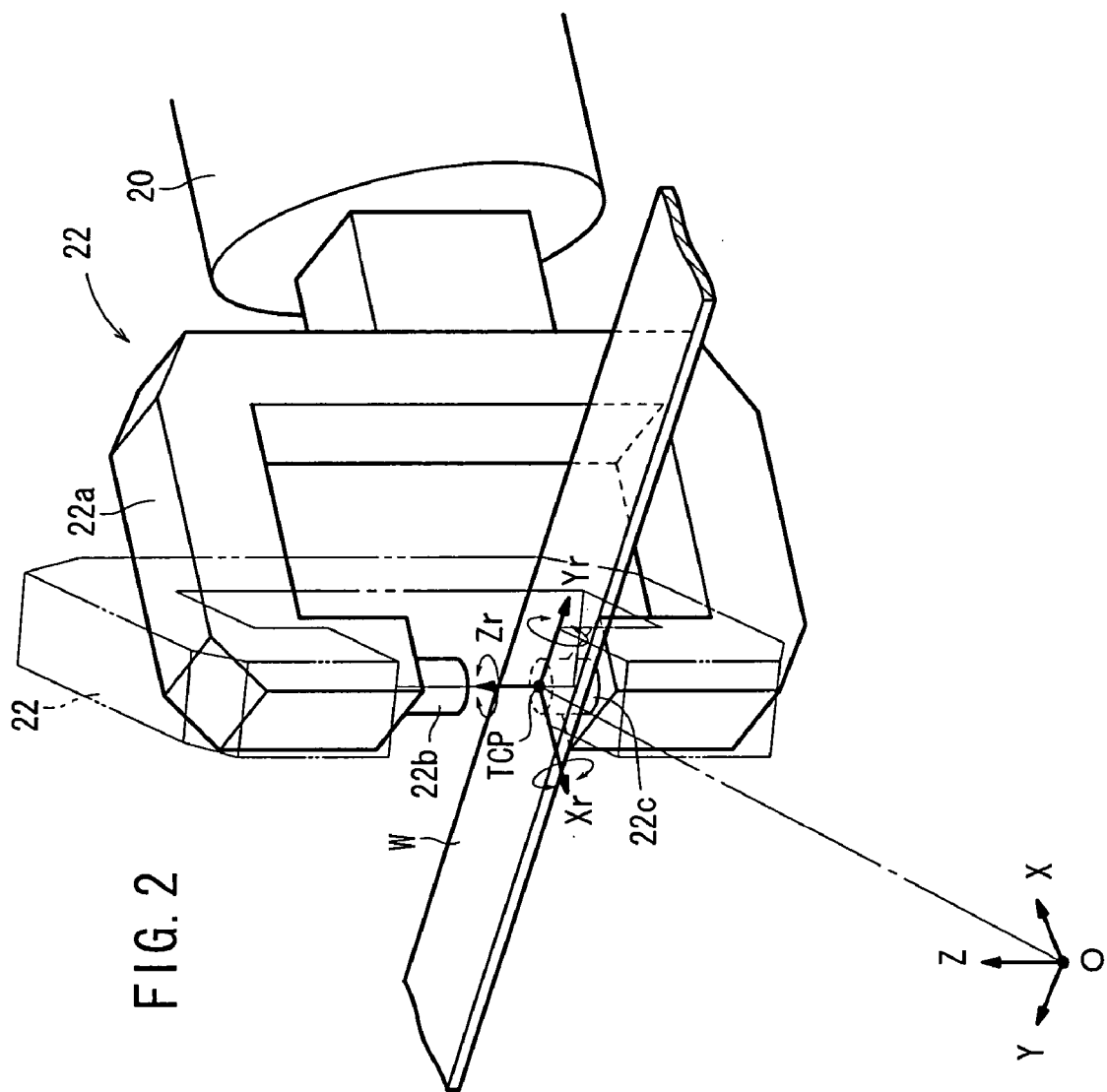
FIG. 2 is a perspective view showing tool coordinates of an end effector and a TCP.

As shown in FIG. 2, the end effector 22 comprises a C-shaped welding gun, and includes a yoke 22a having a pair of openable and closeable electrodes (working members) 22b, 22c disposed respectively on both ends thereof. When closed, the electrodes 22b, 22c are held in contact with a workpiece W at a welding point (hereinafter referred to as TCP (Tool Center Point)).

A direction oriented from the TCP in alignment with the axes of the electrodes 22b, 22c is referred to as a vector Zr, and a direction oriented perpendicularly to the vector Zr and outwardly of the end effector 22 is referred to as a vector Xr. A direction oriented perpendicularly to the vector Zr and the vector Xr is referred to as a vector Yr.

If only the value of the vector Zr is changed when the electrodes 22b, 22c face perpendicularly to the workpiece W, for example, then the attitude of the end effector 22 changes to a position where the yoke 22a has turned while facing perpendicularly to the workpiece W, as indicated by the two-dot-and-dash lines in FIG. 2.

The position of the TCP is represented by three parameters representing orthogonal coordinates X, Y, Z as absolute coordinates from a given origin O.

Mechanisms for actuating the axes J1 through J6 and a mechanism for opening and closing the electrodes 22b, 22c are actuated by respective actuators, not shown. The TCP is determined by the values of respective rotational angles θ1 through θ6 of the axes J1 through J6 and the dimensions of various parts of the articulated robot 12.

The articulated robot 12 operates according to teaching data set in a robot controller 24. The articulated robot 12 and the robot controller 24 are disposed on a production line at site for manufacturing vehicles 200, 202 (see FIGS. 20, 21). When the articulated robot 12 operates, the end effector 22 connected to the tip end thereof can move to a desired position near the vehicles 200, 202 and can be set to a desired orientation. Stated otherwise, the end effector 22 is capable of moving with six degrees of freedom. The articulated robot 12 may have movable mechanisms such as extension and contraction mechanisms, parallel link mechanisms, etc. other than the rotating mechanisms.

Figure 3:
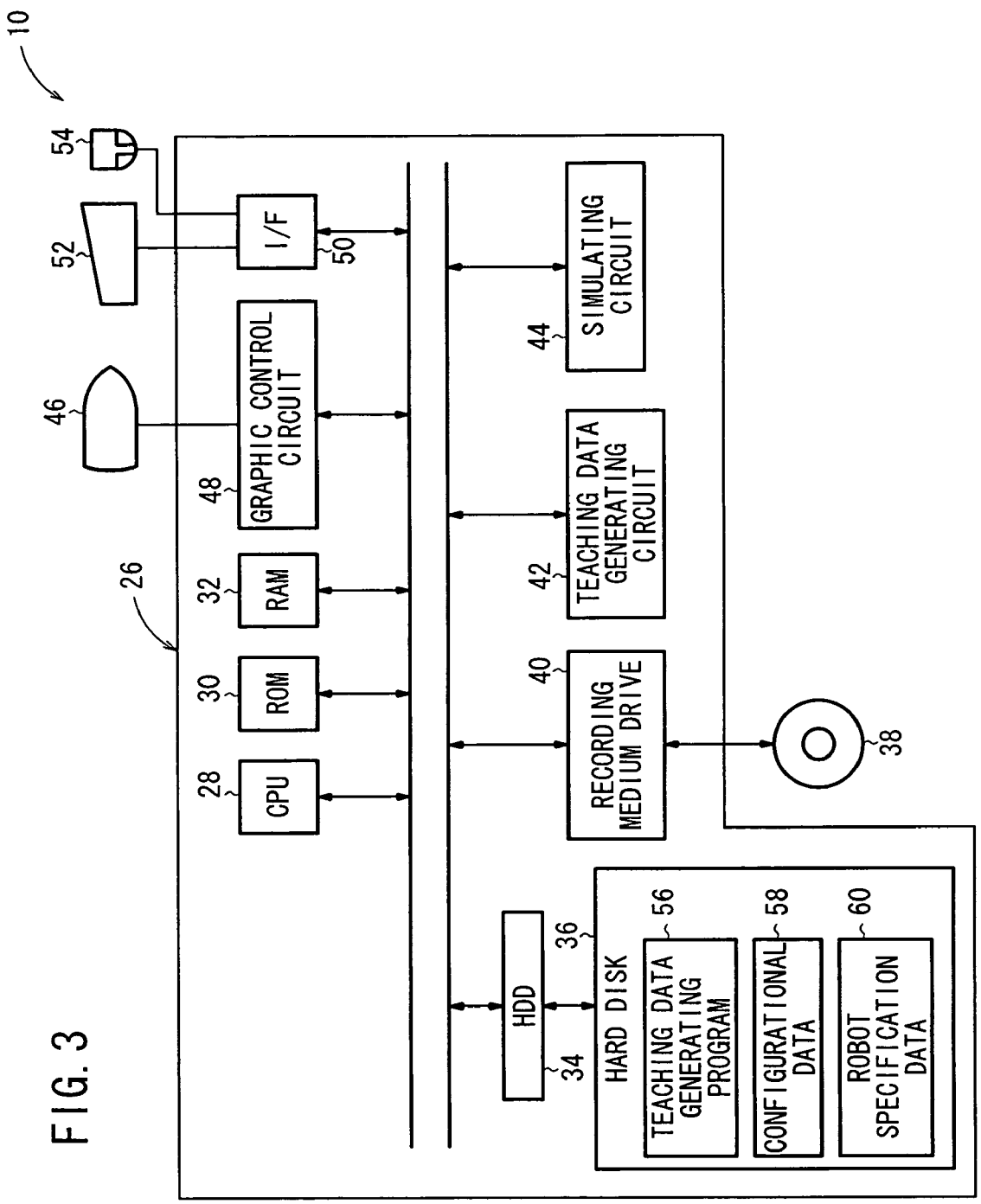
FIG. 3 is a diagram of a circuit of the off-line teaching apparatus according to the present embodiment.

The off-line teaching apparatus 10 comprises a computer. As shown in FIG. 3, a controller 26 thereof comprises a CPU 28 for controlling the off-line teaching apparatus 10 in its entirety, a ROM 30 and a RAM 32 which serve as recording units, a hard disk 36 from and to which data is read and written by a hard disk drive 34, a recording medium drive 40 for reading and writing teaching data, etc. from and to an external recording medium 38 such as a flexible disk, a compact disk, or the like, a teaching data generating circuit 42 for generating teaching data for the articulated robot 12, and a simulating circuit 44 for simulating operation of the articulated robot 12 based on the generated teaching data. To the controller 26, there are connected a display 46 for assisting in generating teaching data and displaying simulated images through a graphic control circuit 48, and a keyboard 52 and a mouse 54 as input devices through an interface 50.

The hard disk 36 stores therein a teaching data generating program 56 for generating teaching data for the articulated robot 12, configurational data 58 with respect to the articulated robot 12, workpieces to be worked, and other pieces of equipment, and robot specification data 60 including operational specifications of the axes of the articulated robot 12.

Figure 4:
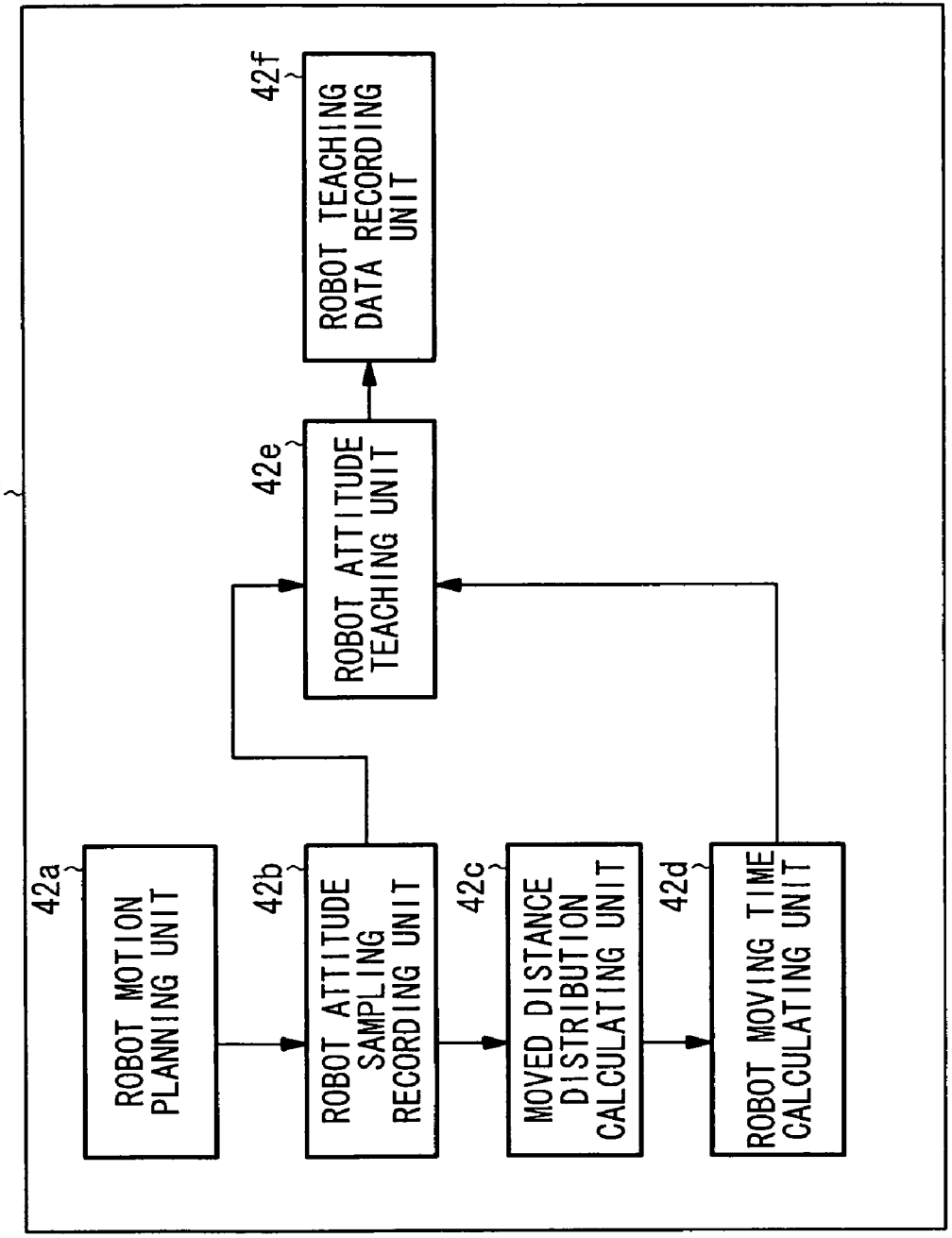
FIG. 4 is a block diagram of a general arrangement of a teaching data generating circuit.

As shown in FIG. 4, the teaching data generating circuit 42 has a robot motion planning unit 42a for establishing a motion plan of the articulated robot 12, a robot attitude sampling recording unit 42b for simulatively moving the articulated robot 12 and recording attitudes of the articulated robot 12 and attitudes of the end effector 22 during the motion, and a moved distance distribution calculating unit 42c for determining distance distribution ratios between working points P1, P2, . . . , Pe (see FIG. 5) for the articulated robot 12 to work on. The teaching data generating circuit 42 also has a robot moving time calculating unit 42d for determining a moving time when the articulated robot 12 moves along a given path, a robot attitude teaching unit 42e for teaching attitudes to the articulated robot 12, and a robot teaching data recording unit 42f for recording teaching data.

Figure 5:
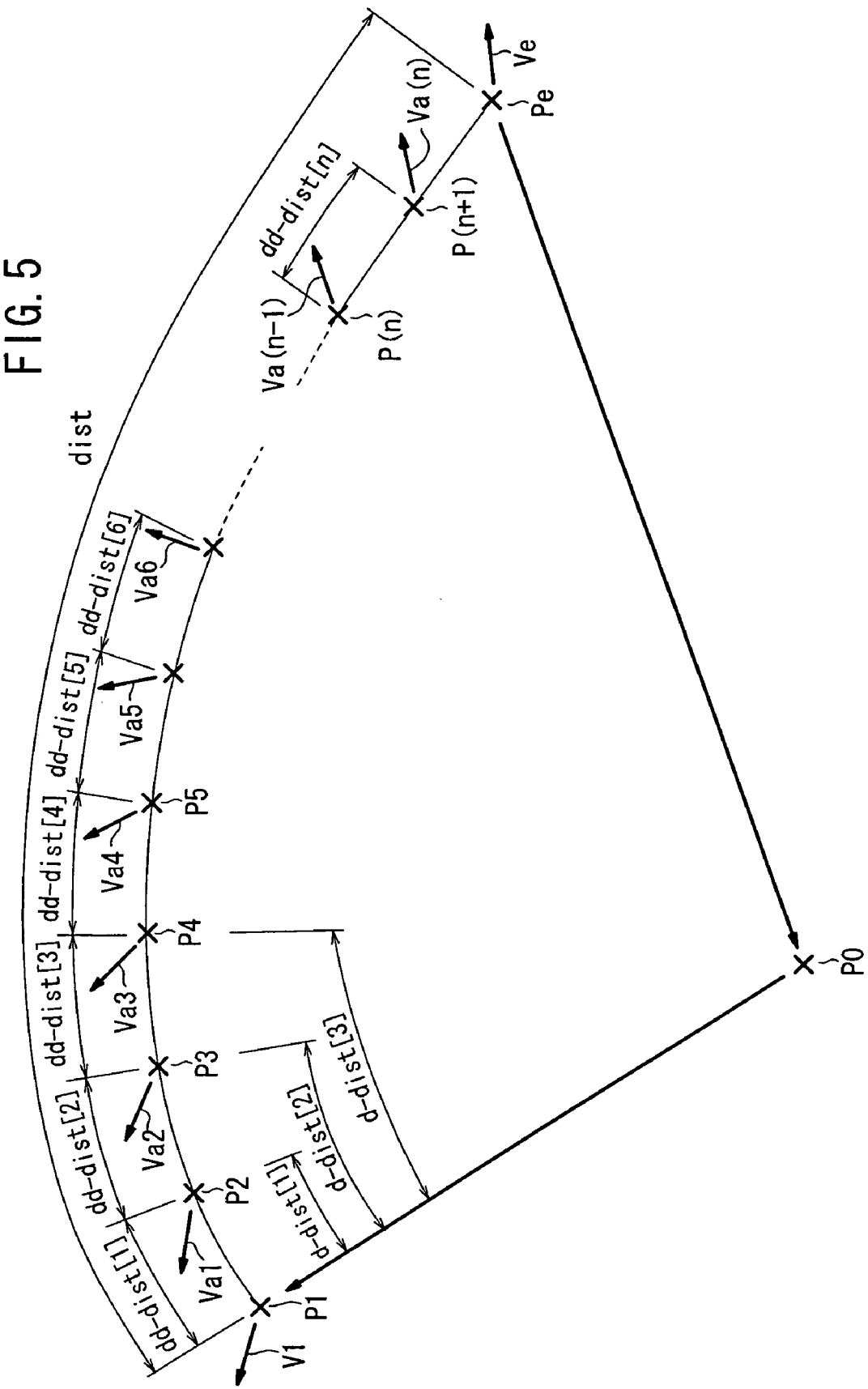
FIG. 5 is a diagram showing the relationship between a working origin and working points.

The articulated robot 12 will work successively on the working points P1, P2, . . . , Pe shown in FIG. 5. These working points P1, P2, . . . , Pe represent positions of the TCP, and are successively arranged in a straight or curved pattern. The working point P1 at one end is a spot which the articulated robot 12 works on first, and is referred to as a first working point. The working point Pe at the other end is a spot which the articulated robot 12 works on finally, and is referred to as a final working point. The articulated robot 12 is placed in a working origin P0 before and after its working process.

Teaching data for the articulated robot 12 is generated based on a path table 100 (see FIG. 6) in which attitudes of the articulated robot 12 and attitudes of the end effector 22 are recorded. The path table 100 is a rewritable table and is recorded in a recording unit such as the RAM 32 or the like.

As shown in FIG. 6, the path table 100 comprises a "TCP POSITION" column, an "END EFFECTOR ORIENTATION" column, and an "EACH AXIS ANGLE" column which are representative of tool coordinate data. The "TCP POSITION" column contains data representing absolute coordinates of the end effector 22, i.e., X, Y, Z values, recorded therein. The "END EFFECTOR ORIENTATION" column contains vectors Xr, Yr, Zr of coordinates representing attitude of the end effector 22. The tool coordinate data is represented by six parameters which are expressed in the sequence of values corresponding to X, Y, Z, Xr, Yr, and Zr.

The "EACH AXIS ANGLE" column comprises rotational angles θ1 through θ6 which are representative of rotational angles of the axes J1 through J6.

The path table 100 is of basically the same structure as first teaching data 150 (see FIG. 22) and second teaching data 160 (see FIG. 24) to be described later. For illustrative purposes, an "ENTRY DIRECTION" column and a "ROTATION" column in the first teaching data 150 and the second teaching data 160 are omitted from the path table 100.

A teaching data generating method of smoothly moving the articulated robot 12 to shorten an overall moving time thereof using the off-line teaching apparatus 10, and a teaching data generating method (hereinafter also referred to as an existing data utilizing method") of utilizing existing teaching data with respect to an existing workpiece to generate teaching data with respect to another workpiece, using the off-line teaching apparatus 10, will be described below.

These methods are basically carried out by the CPU 28 and the teaching data generating circuit 42 (see FIG. 3) based on the teaching data generating program 56. However, the methods may be partly carried out directly by the operator.

Motion of the articulated robot 12 is virtually realized by the functions of the simulating circuit 44, etc., and there is no need to actually move the articulated robot 12.

Of these methods, a first generating method, among first through third generating methods of smoothly moving the articulated robot 12 to shorten an overall moving time thereof, will first be described below with reference to FIGS. 7 through 14.

Figure 7:
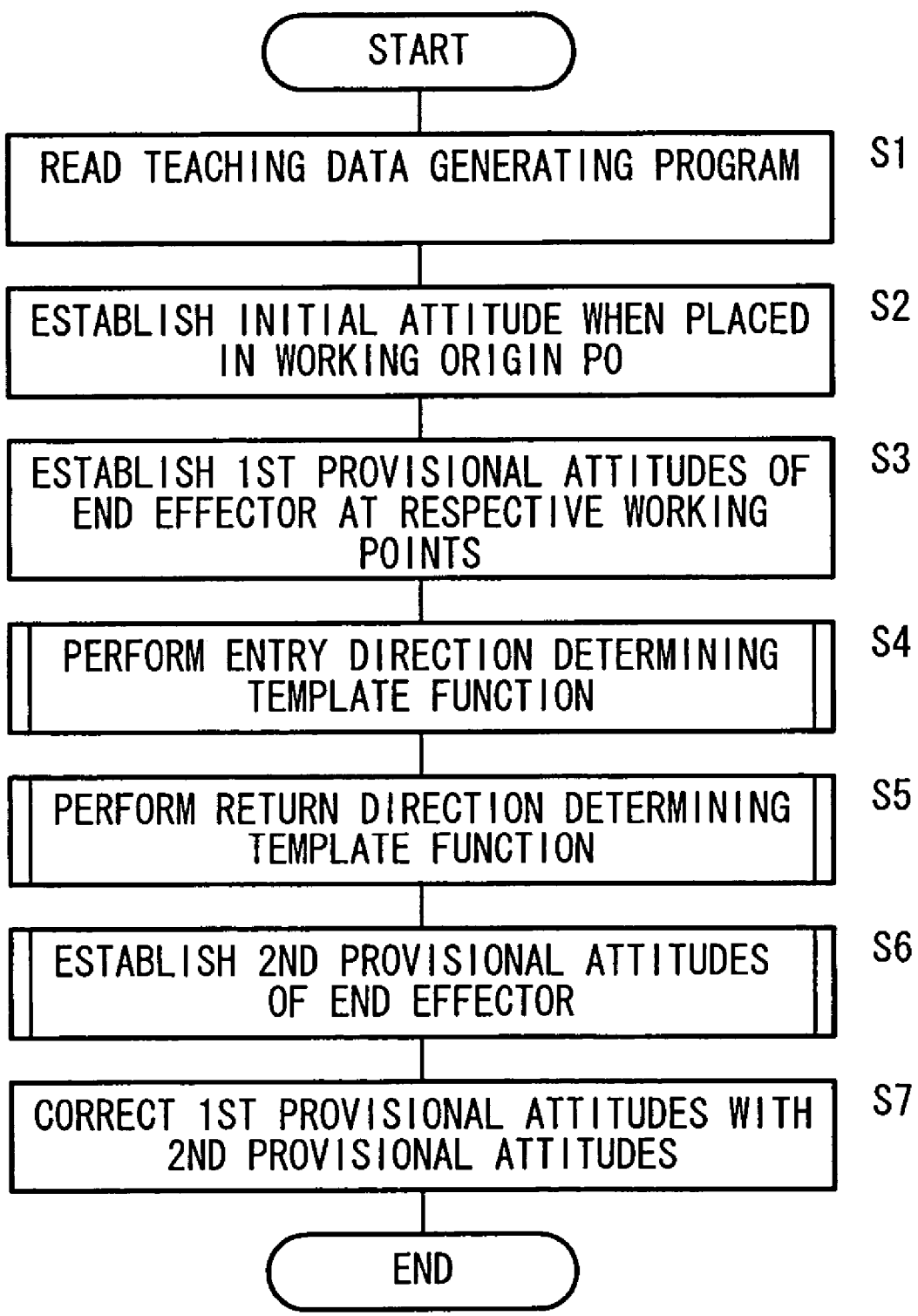
FIG. 7 is a flowchart of the sequence of a teaching data generating method for smoothly moving an articulated robot to shorten a moving time thereof.

As shown in FIG. 7, according to the first method of generating teaching data for the articulated robot 12, the teaching data generating program 56 is read from the hard disk 36 and loaded into the teaching data generating circuit 42 in step S1. Then, the configurational data 58 with respect to the articulated robot 12, workpieces to be worked, and other pieces of equipment, and given data with respect to the articulated robot 12, i.e., the robot specification data 60, are read from the hard disk 36.

Then, in step S2, a robot attitude of the articulated robot 12, which is an initial attitude achieved when the end effector 22 is placed in the working origin P0, is established. The initial attitude is established in view of the layout of other nearby articulated robots 12.

Then, in step S3, the positions of the end effector 22 at the respective working points P1, P2, . . . , Pe and tool attitudes thereof are established as first provisional attitudes. If the end effector 22 is a C-shaped welding gun, then the first provisional attitudes are normally established such that the electrodes 22b, 22c face perpendicularly to the surface of the workpiece W.

Specifically, the attitudes of the end effector 22 that are established as the first provisional attitudes are represented by the vectors Xr, Yr, Zr containing the data in the "END EFFECTOR ORIENTATION" column and the coordinates X, Y, Z containing the data in the "TCP POSITION" column in the path table 100. At this time, the "EACH AXIS ANGLE" column in the path table 100 may contain no data.

Then, in step S4, the teaching data generating circuit 42 performs an entry direction determining template function. According to the entry direction determining template function, an attitude of the articulated robot 12 at the first working point P1 is determined in order for the end effector 22 to reach the first working point P1 within a shortest time from a teaching spot preceding the first working point P1 (i.e., the working origin P0).

Then, in step S5, the teaching data generating circuit 42 performs a return direction determining template function. According to the return direction determining template function, an attitude of the articulated robot 12 at the final working point Pe is determined in order for the end effector 22 to reach a teaching spot following the final working point Pe (i.e., the working origin P0) within a shortest time from the final working point Pe.

Then, in step S6, the teaching data generating circuit 42 establishes second provisional attitudes of the end effector 22 with respect to other working points than the first working point P1 and the final working point Pe, based on the attitudes of the articulated robot 12 which have been determined by the entry direction determining template function and the return direction determining template function. The second provisional attitudes are established as attitudes for smoothly moving the end effector 22 from the first working point P1 to the final working point Pe.

The processings of steps S4, S5, S6 are performed as respective subroutines. These subroutines will be described later (see FIGS. 11 to 14).

Then, in step S7, the first provisional attitudes are corrected by the second provisional attitudes to establish attitudes of the end effector 22 at the respective working points.

Figure 8:
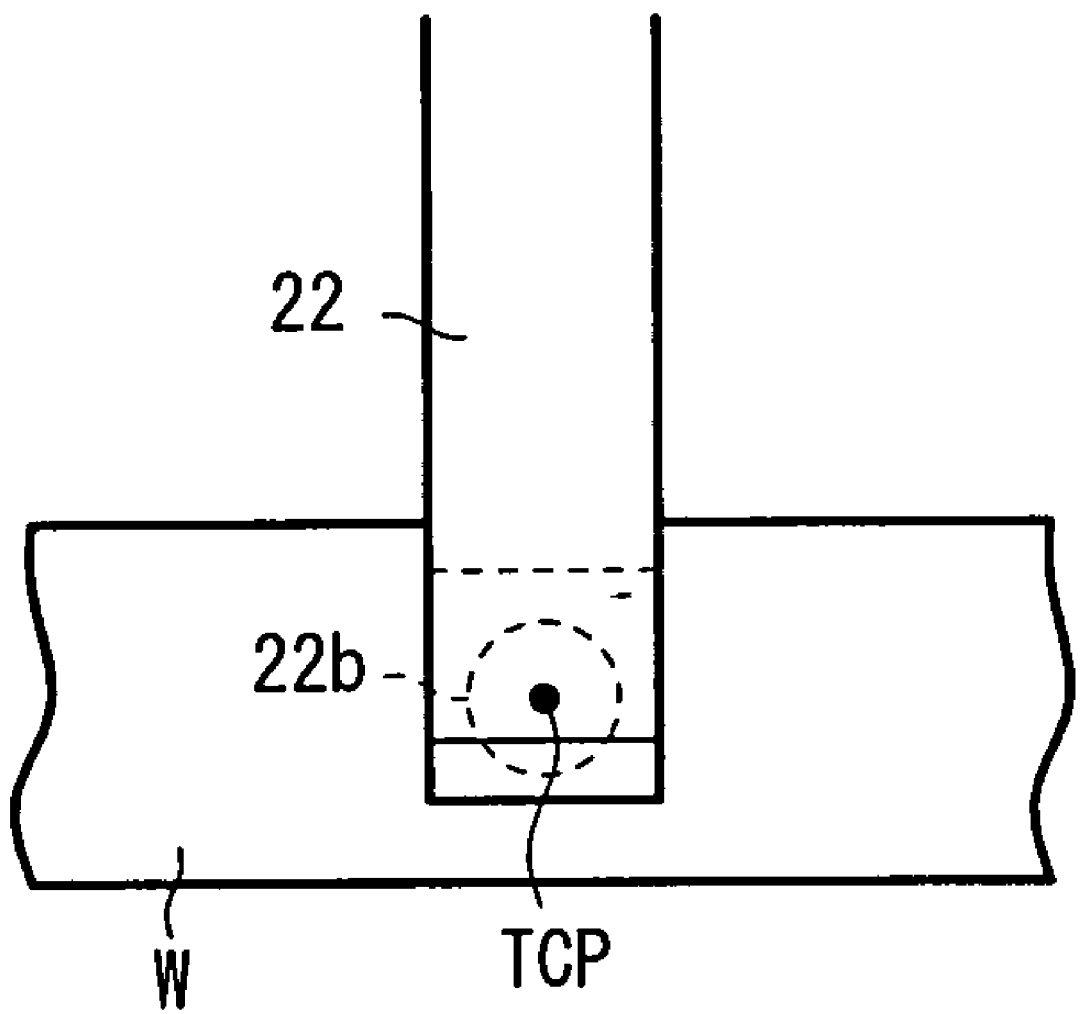
FIG. 8 is a view showing a first provisional attitude of the end effector with respect to a workpiece.
Figure 9:
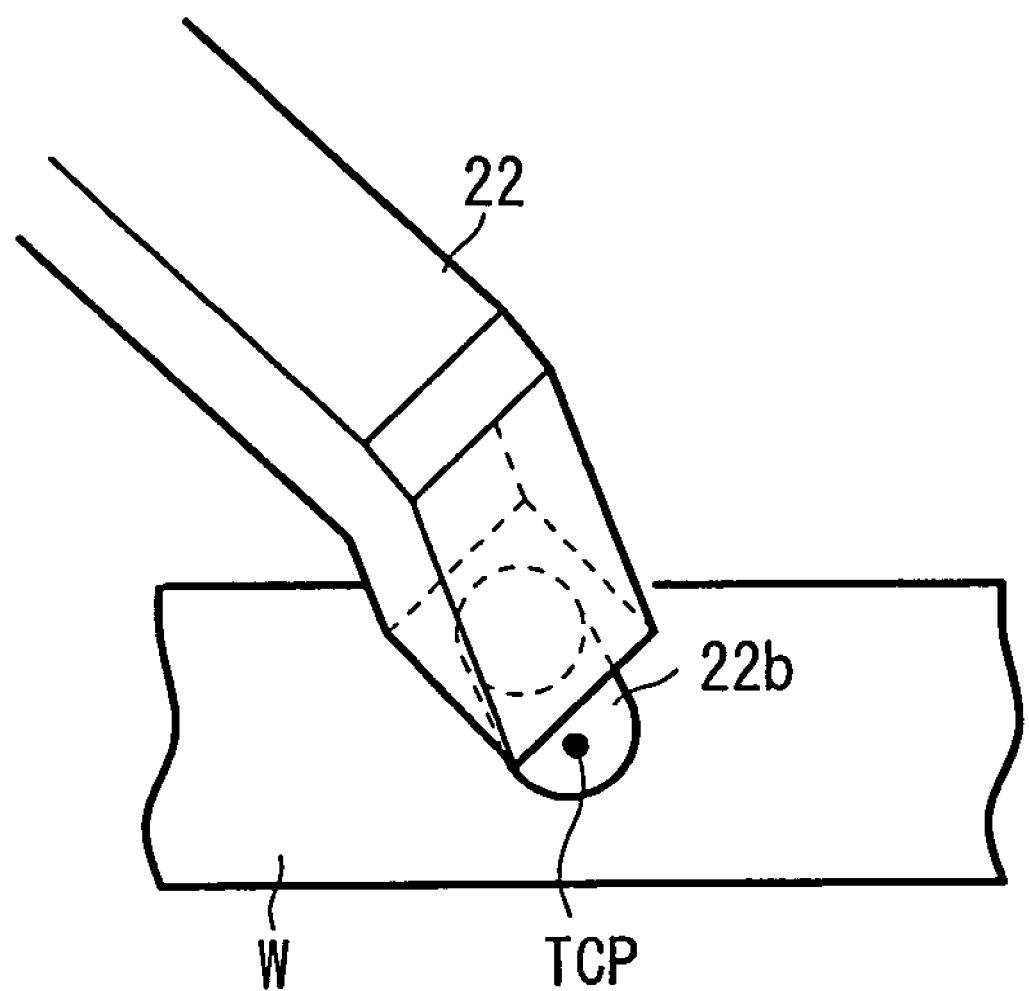
FIG. 9 is a view showing a second provisional attitude of the end effector with respect to the workpiece.
Figure 10:
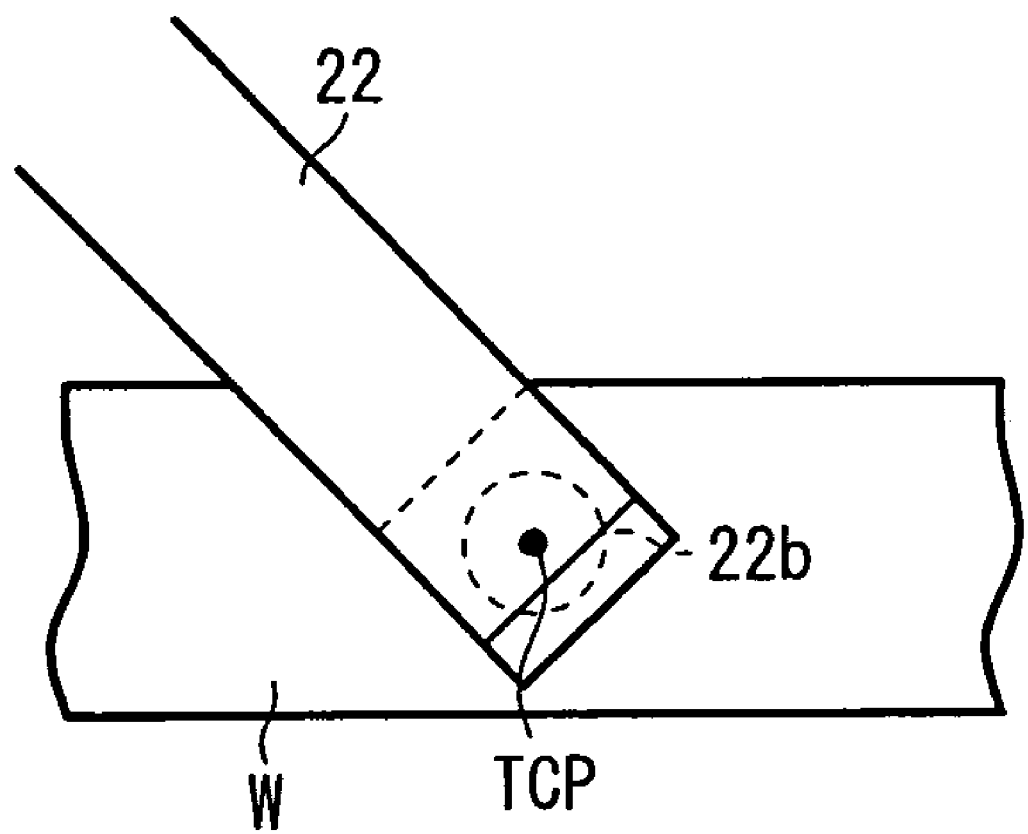
FIG. 10 is a view showing the attitude of the end effector with respect to the workpiece after the first provisional attitude is corrected by the second provisional attitude.

The processing of step S7 is generally performed such that when the attitude of the end effector 22 as represented by the first provisional attitude faces perpendicularly to the workpiece W as shown in FIG. 8 and the attitude of the end effector 22 as represented by the second provisional attitude does not face perpendicularly to the workpiece W and is oriented differently from the first provisional attitude as viewed from the workpiece W as shown in FIG. 9, the first provisional attitudes may be corrected in step S7 to keep the end effector 22 facing perpendicularly to the workpiece W and orient the end effector 22 in the same direction as the second provisional attitude as viewed from the workpiece W. Specifically, when the data of the first provisional attitude and the second provisional attitude corresponding to Xr, Yr, Zr in the "END EFFECTOR ORIENTATION" column of the path table 100 are represented by Xra, Yra, Zra and Xrb, Yrb, Zrb, respectively, Zra of the data of the first provisional attitude may be replaced with Zrb of the data of the second provisional attitude. More specifically, since data corresponding to Zrb is established as corrective data D[j] for each working point to work on by a process to be described later, a substitution Zr←D[j] may be made.

According to the above corrective step, while the electrodes 22b, 22c of the end effector 22 keep oriented perpendicularly to the workpiece W, the end effector 22 is turned about the electrodes 22b, 22c and is oriented in the same direction as the second provisional attitude as viewed from the workpiece W.

Figure 11:
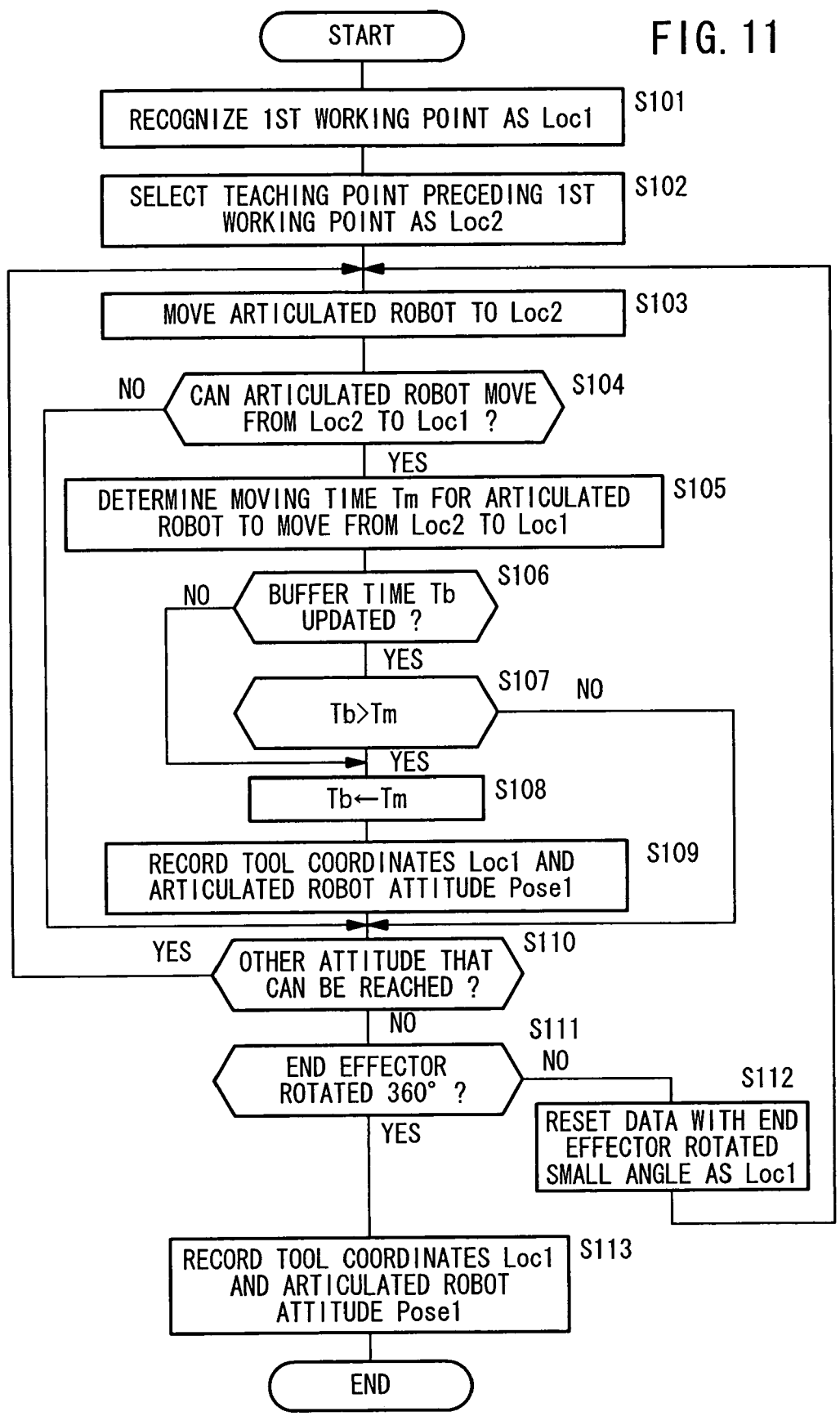
FIG. 11 is a flowchart of a sequence of an entry direction determining template function.

The entry direction determining template function that is performed in step S4 will be described in detail below with reference to FIG. 11.

In step S101, the tool coordinate data in the first working point P1, which is a first working point, is recognized from the path table 100 (FIG. 6), and is referred to as Loc1.

Then, in step S102, a teaching spot preceding the first working point P1 is selected, and the tool coordinate data in the selected teaching spot is referred to as Loc2. In the example described below, Loc2 is regarded as the working origin P0.

Then, in step S103, the articulated robot 12 is moved to a position indicated by Loc2.

Then, in step S104, it is confirmed whether the articulated robot 12 can move from Loc2 to Loc1. If the movement is possible, then control goes to step S105. If the movement is not possible, then control jumps to step S110.

Then, in step S105, a moving time Tm required to move the articulated robot 12 from Loc2 to Loc1 is determined.

Then, in step S106, it is confirmed whether a buffer time Tb has been updated or not. The buffer time Tb is a variable which is initially set to "0". If Tb=0, then it has not been updated and control goes to step S108. If T≠0, then it has been updated and control goes to step S107.

In step S107, the buffer time Tb and the moving time Tm at the time are compared with each other. If Tb>Tm, then control goes to step S108. If Tb≦Tm, then control jumps to step S110.

In step S108, the buffer time Tb is updated by being replaced with the moving time Tm.

In step S109, the tool coordinate data Loc1 at the time and the attitude of the articulated robot 12 as Pose1 are recorded. Pose1 and Pose3 described later, etc. are represented by six parameters θ1 through θ6 (see FIG. 6).

As described above, the buffer time Tb and the moving time Tm are compared with each other, and if the moving time Tm is shorter than the buffer time Tb, then the buffer time Tb is updated to set itself to a shortest moving time. The attitude of the articulated robot 12 at the time is recorded as Pose1.

Then, in step S110, any other attitude of the articulated robot 12 that can be achieved on movement from Loc2 to Loc1 is searched for. If there is any other attitude, then the tool coordinate data representing the other attitude is set as Loc1, and control returns to step S103. If there is no any other attitude, then control goes to step S111.

In step S111, a decision is made with respect to rotating the end effector 22 while keeping the electrode 22b facing perpendicularly to the workpiece W at the first working point P1. If the end effector 22 has been rotated 360° from a given attitude, then control goes to step S113. If the rotational angle is smaller than 360°, then control goes to step S112.

The processing of step S111 may be carried out in view of a region of interference with the workpiece based on the motion range table disclosed in Patent document 3 referred to above.

In step S112, the tool coordinate data produced when the end effector 22 is turned at a given small angle while keeping the electrode 22b facing perpendicularly to the workpiece W is reset as Loc1, and then control goes back to step S103. Specifically, the end effector 22 may be rotated by changing the data of the vector Zr of the tool coordinate data Loc1, by a given amount (see FIG. 2).

In step S113, the tool coordinate data Loc1 and the posture Pose1 of the articulated robot 12, which were recorded in step S109, are recorded as a formal attitude at the first working point P1. The tool coordinate data Loc1 formally determined at this time is represented by six parameters x1, y1, z1, rx1, ry1, rz1.

When the entry direction determining template function is thus performed, it is possible to acquire an entry path in a shortest time from the working origin P0 to the first working point P1, and an attitude of the articulated robot 12 and an attitude of the end effector 22 at the first working point P1. The attitude of the end effector 22 at the first working point P1 which is acquired by the entry direction determining template function is indicated as a vector V1 in FIG. 5.

Figure 12:
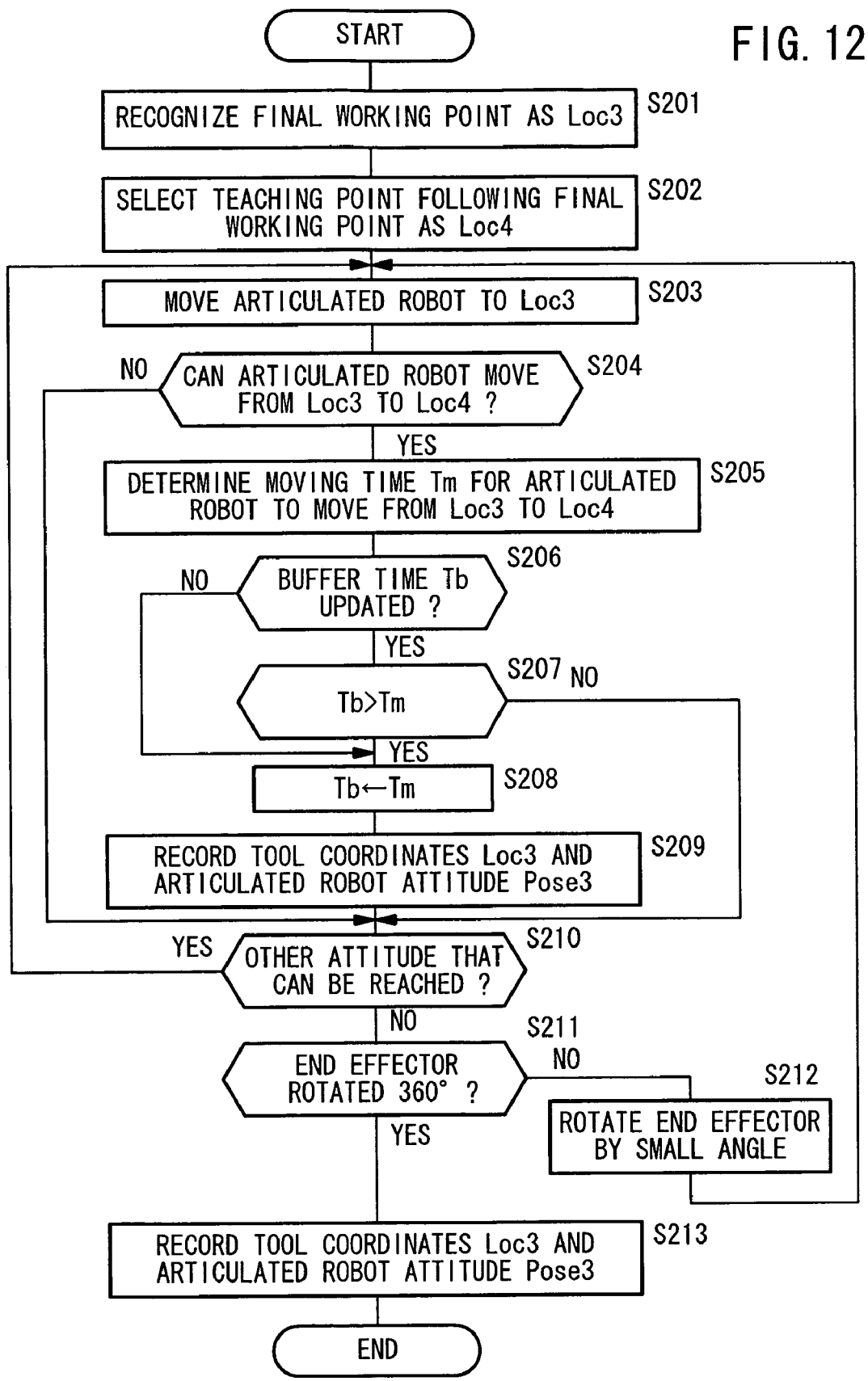
FIG. 12 is a flowchart of a sequence of a return direction determining template function.

The return direction determining template function that is performed in step S5 is carried as according to a sequence shown in FIG. 12. The return direction determining template function represents a process for determining an attitude of the articulated robot 12 at the working point Pe, which is a final working point, so that the articulated robot 12 will reach a teaching spot in a subsequent stage within a shortest time from the working point Pe. The working origin P0 is selected as the teaching spot in the subsequent stage. The return direction determining template function is a reversal of the entry direction determining template function, with the first working point P1 is replaced with the final working point Pe. Other basic processing details of the return direction determining template function are identical to those of the entry direction determining template function. Therefore, details of the return direction determining template function will not be described below. According to the return direction determining template function, an attitude Pose3 of the articulated robot 12 at the final working point Pe and tool coordinate data Loc3 (x3, y3, z3, rx3, ry3, rz3) of the end effector 22 are determined. A return path in a shortest time from the final working point Pe to the working origin Po is acquired. The attitude of the end effector 22 at the final working point Pe which is acquired by the return direction determining template function is indicated as a vector Ve in FIG. 5.

To perform the entry direction determining template function and the return direction determining template function, the technologies disclosed in Japanese Laid-Open Patent Publication No. 2002-239955 and Japanese Laid-Open Patent Publication No. 2002-239957 may be employed.

Figure 13:
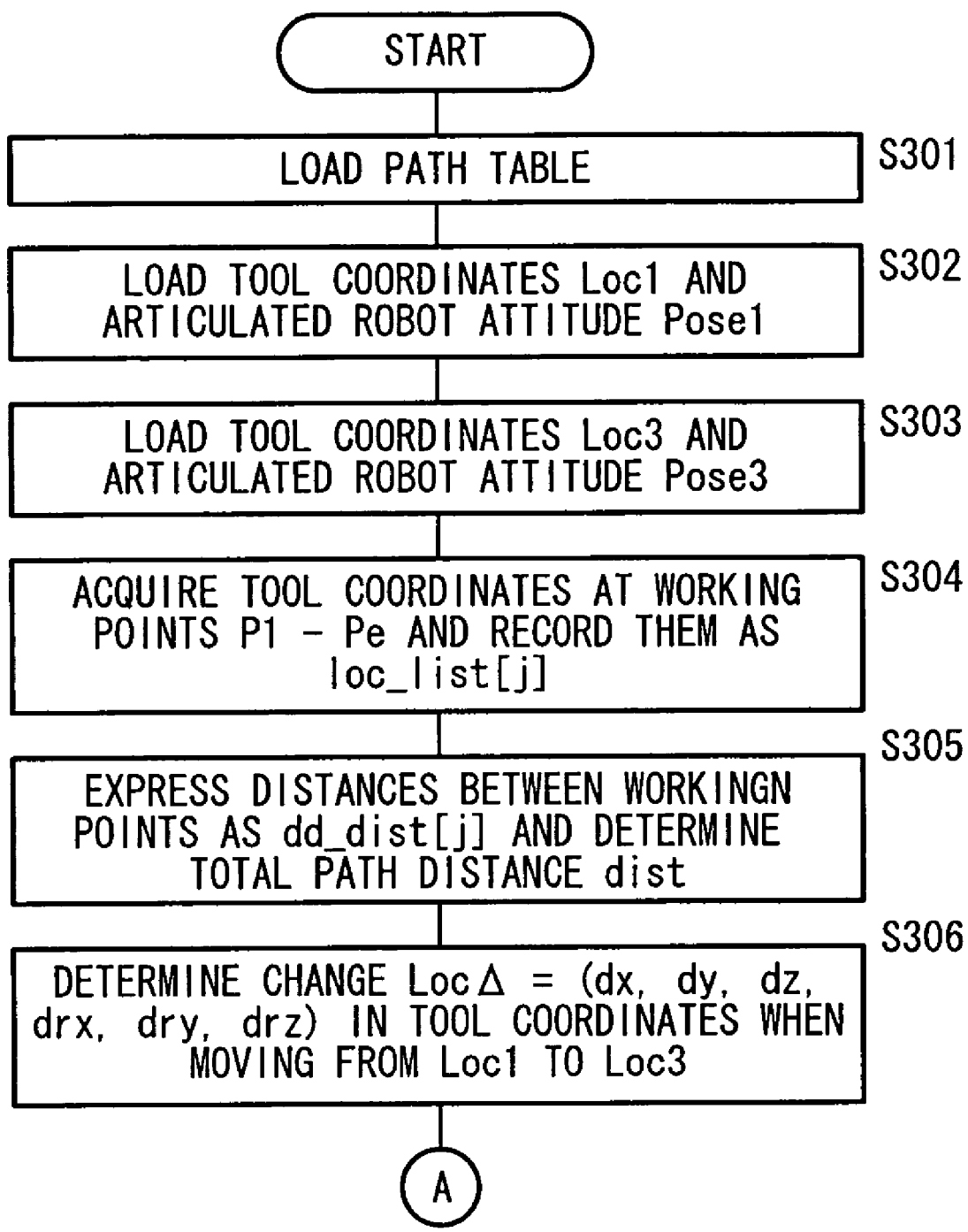
FIG. 13 is a flowchart (1) of a sequence for determining the second provisional attitude of the end effector according to a first generating method.
Figure 14:
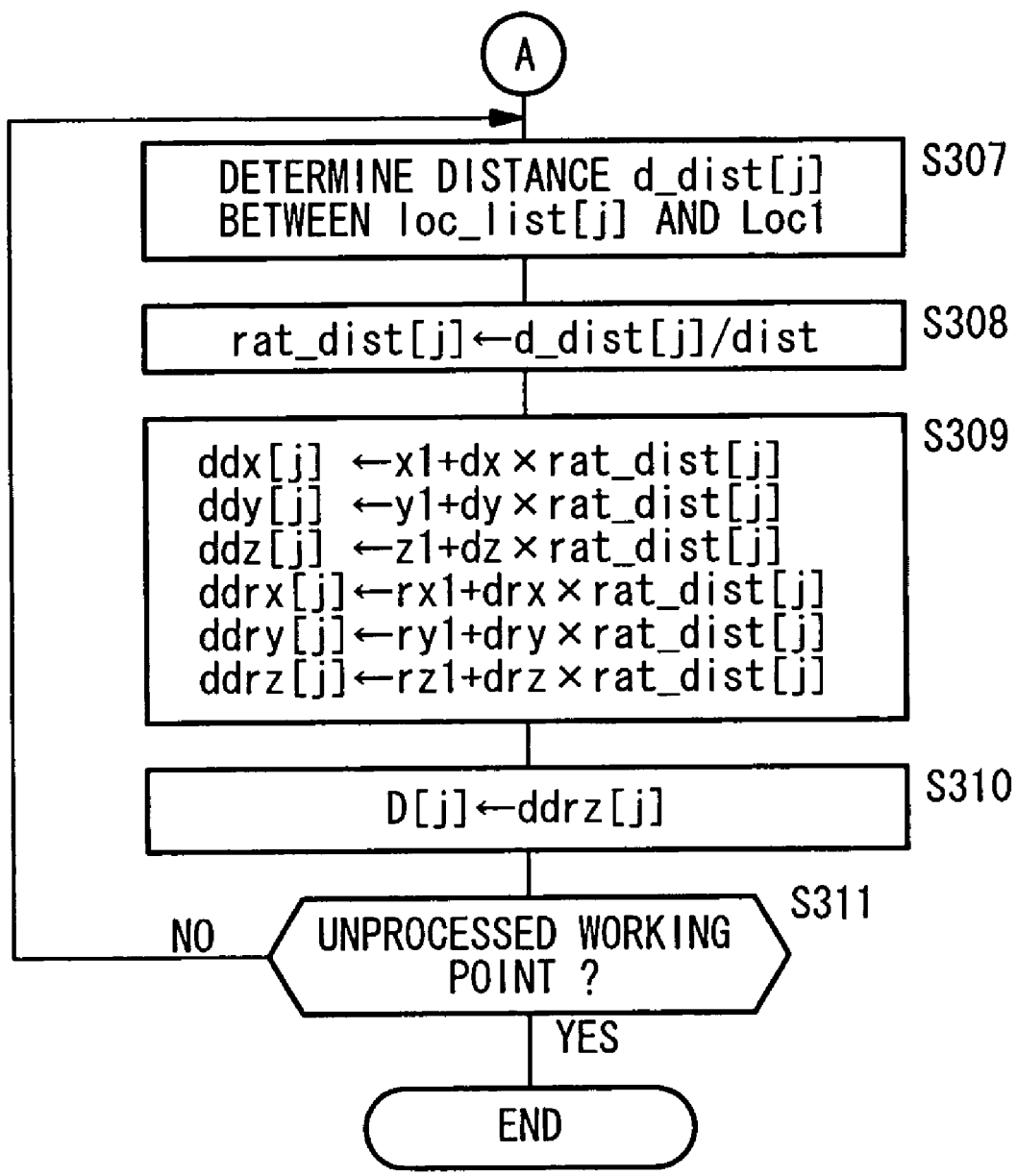
FIG. 14 is a flowchart (2) of the sequence for determining the second provisional attitude of the end effector according to the first generating method.

The process of establishing second provisional attitudes of the end effector 22 in step S6 will be described below with reference to FIGS. 13 and 14.

In step S301, the path table 100 is loaded into a given recording unit.

Then, in step S302, the tool coordinate data Loc1 (x1, y1, z1, rx1, ry1, rz1) and the attitude Pose1 of the articulated robot 12, which are the processed result of the entry direction determining template function performed in step S4, are loaded.

Then, in step S303, the tool coordinate data Loc3 (x3, y3, z3, rx3, ry3, rz3) and the attitude Pose3 of the articulated robot 12, which are the processed result of the return direction determining template function performed in step S5, are loaded.

Then, in step S304, the tool coordinate data of the working points P1, P2, P3, ..., Pe are acquired based on the path table 100. Of the working points P1, P2, P3, ..., Pe, the number of working points to be processed except for the first working point P1 and the final working point Pe is recorded in a variable n, and the tool coordinate data at the working points to be processed are successively recorded as loc_list[j], using a given counter j. The acquired loc_list[j] are represented as six parameters x[j], y[j], z[j], rx[j], ry[j], rz[j]. Of these parameters, x[j], y[j], z[j] represent absolute coordinates of the TCP, and rx[j], ry[j], rz[j] represent an orientation of the end effector 22.

Then, in step S305, distances between the working points P1 through Pe are expressed as dd_dist[j] (j=1, 2, ..., (n+1)), and a total path distance dist represented by the sum of (n+1) of dd_dist[j] is determined. In this manner, the total path distance dist along intervals between the working points can properly be determined even if the working points P1 through Pe are arranged in a curved pattern.

Then, in step S306, a change LocΔ=(dx, dy, dz, drx, dry, drz) in the tool coordinate data at the time when the end effector 22 moves from Loc1 to Loc3 is determined. The change LocΔ is determined as LocΔ←Loc3−Loc1.

Subsequently in steps S307 through S310, second provisional attitudes are determined with respect to the working points loc_list[j] to be processed while incrementing the counter j from 1 to n.

In step S307, the distance d_dist[j] between loc_list[j] and Loc1 is determined as d_dist[j]←dd_dist[1]+dd_dist[2]+...+dd_dist[j] (see FIG. 5).

Then, in step S308, a distance ratio rat_dist[j] of the distance d_dist[j] to the total path distance dist is determined as d_dist[j]/dist. The distance ratio rat_dist[j] can accurately express the ratio of the lengths of curves even if the working points P1 through Pe are arranged in a curved pattern.

Then, in step S309, second provisional attitudes of the end effector 22 are determined by proportionally dividing Loc1, Loc3 by rat_dist[j]. The second provisional attitudes are expressed by six parameters ddx[j], ddy[j], ddz[j], ddrx[j], ddry[j], ddrz[j] representing tool coordinate data, and are determined as follows:

ddx[j]←x1+dx×rat_dist[j]
ddy[j]←y1+dy×rat_dist[j]
ddz[j]←z1+dz×rat_dist[j]
ddrx[j]←rx1+drx×rat_dist[j]
ddry[j]←ry1+dry×rat_dist[j]
ddrz[j]←rz1+drz×rat_dist[j]

The second provisional attitudes expressed by these six parameters are indicated as vectors Va1, Va2, ..., Va(n) in FIG. 5. These vectors Va1, Va2, ..., Va(n) are established such that they change progressively from the vector V1 to the vector Ve depending on the distance ratio rat_dist[j].

Then, in step S310, ddrz[j] is selected and substituted as corrective data D[j] for correcting the first provisional attitudes.

The parameters ddx[j], ddy[j], ddz[j], ddrx[j] and ddry[j] are recorded as reference data.

Then, in step S311, it is confirmed whether the corrective data D[j] has been established for all the working points to be processed. If there is a working point not yet processed, then the counter j is incremented by [+1], after which control goes back to step S307 for continued processing. If all the working points to be processed have been processed, then the subroutine shown in FIGS. 13 and 14 is finished, and control returns to step S7 (see FIG. 7).

As described above, in step S7, the value of the vector Zr of the first provisional attitudes is replaced with the corrective data D[j] to determine tool coordinate data of the end effector 22 at all the working points to be processed, and the determined tool coordinate data are recorded in the corresponding column of the path table 100 (see FIG. 6). Based on the tool coordinate data, attitudes of the articulated robot 12, i.e., θ1 through θ6, are determined by an inverse conversion process using a determinant. The determined data is recorded in the "EACH AXIS ANGLE" column of the path table 100.

In this manner, teaching data for the articulated robot 12 is generated. After the teaching data is recorded in the hard disk 36, it is confirmed for operation by the simulating circuit 44, and recorded in the external recording medium 38 through the recording medium drive 40. The teaching data recorded in the external recording medium 38 is downloaded into the robot controller 24 for controlling the articulated robot 12.

According to the first method of generating teaching data for the articulated robot 12, as described above, tool coordinate data of the end effector 22 at the respective working points to be processed between the first working point P1 and the final working point Pe are generated based on the distance ratio rat_dist[j]. Therefore, the attitudes of the end effector 22 are progressively changed from the working point P1 to the working point Pe, so that the end effector 22 can smoothly be moved between the working point P1 and the working point Pe within a short time.

The tool coordinate data Loc1 which represents the attitude of the end effector 22 at the first working point P1 is established as representing an attitude for moving the end effector 22 within a shortest period from the preceding working point (i.e., the working origin P0) by the entry direction determining template function. Therefore, when the end effector 22 starts to operate, the end effector 22 can move quickly to the first working point P1. The end effector 22 can thus operate within a short time including a moving time before the end effector 22 starts to operate.

Furthermore, the tool coordinate data Loc3 which represents the attitude of the end effector 22 at the final working point Pe is established as representing an attitude for moving the end effector 22 within a shortest period to the next working point (i.e., the working origin P0) by the return direction determining template function. Therefore, after the end effector 22 finishes its work at the final working point Pe, the end effector 22 can quickly be retracted from the final working point Pe, and can thus operate within a short time including a moving time after the end effector 22 finishes its work.

The second generating method of smoothly moving the articulated robot 12 to shorten an operating time thereof will now be described below. According to the second generating method (and a third generating method to be described later), the main routine, the entry direction determining template function, and the return direction determining template function are identical to those shown in FIGS. 7, 11, and 12 according to the first method, but the second generating method differs as to the process of establishing second provisional attitudes of the end effector 22 in step S6 in FIG. 7. The subroutine of step S6 will be described below with reference to FIGS. 15 and 16.

Figure 15:
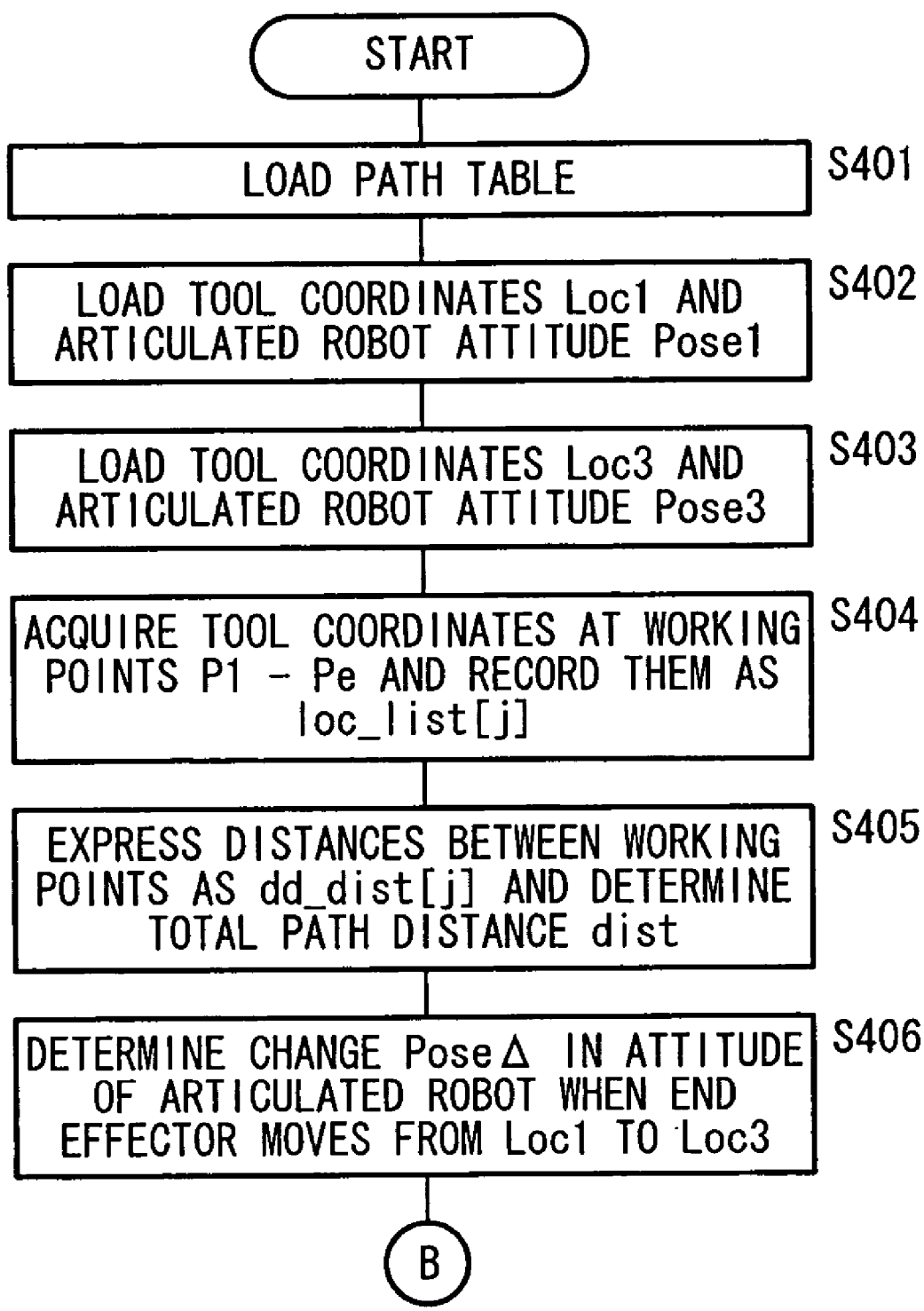
FIG. 15 is a flowchart (1) of a sequence for determining the second provisional attitude of the end effector according to a second generating method.

Steps S401 through S405 shown in FIG. 15 are identical to steps S301 through S305 described above.

After step S405, an attitude change PoseΔ of the articulated robot 12 at the time when the end effector 22 moves from Loc1 to Loc3 is determined in step S406. As the attitudes of the articulated robot 12 are expressed as Pose1, Pose3 represented by θ1 through θ6 which are rotational angles of the axes J1 through J6, the attitude change PoseΔ is determined as PoseΔ←Pose3−Pose1.

Steps S407, S408 are the same as steps S307, S308 described above. A distance ratio rat_dist[j] is determined in steps S407, S408.

Then, in step S409, a proportionally divided attitude ddPose of the articulated robot 12 is determined by proportionally dividing Pose1, Pose3 by rat_dist[j]. The attitude ddPose is determined as ddPose←Pose1+rat_dist×d_pose.

The proportionally divided attitude ddPose is established such that it changes progressively from Pose1 to Pose3 depending on the distance ratio rat_dist[j] of the working points to be processed. The orientation of the end effector 22 which is determined by the attitude of the articulated robot 12 represented by the proportionally divided attitude ddPose is also established such that it changes progressively depending on the distance ratio rat_dist[j].

Then, in step S410, tool coordinate data xj, yj, zj, rxj, ryj, rzj of the end effector 22 at the time the articulated robot 12 has the proportionally divided attitude ddPose are determined. These six parameters are determined by successively integrating the rotational angles of the axes J1 through J6 and a determinant representing the lengths of the respective arms. These six parameters are representative of second provisional attitudes of the end effector 22.

Then, in step S411, rzj is selected and substituted as corrective data D[j] for correcting the first provisional attitudes.

Figure 16:
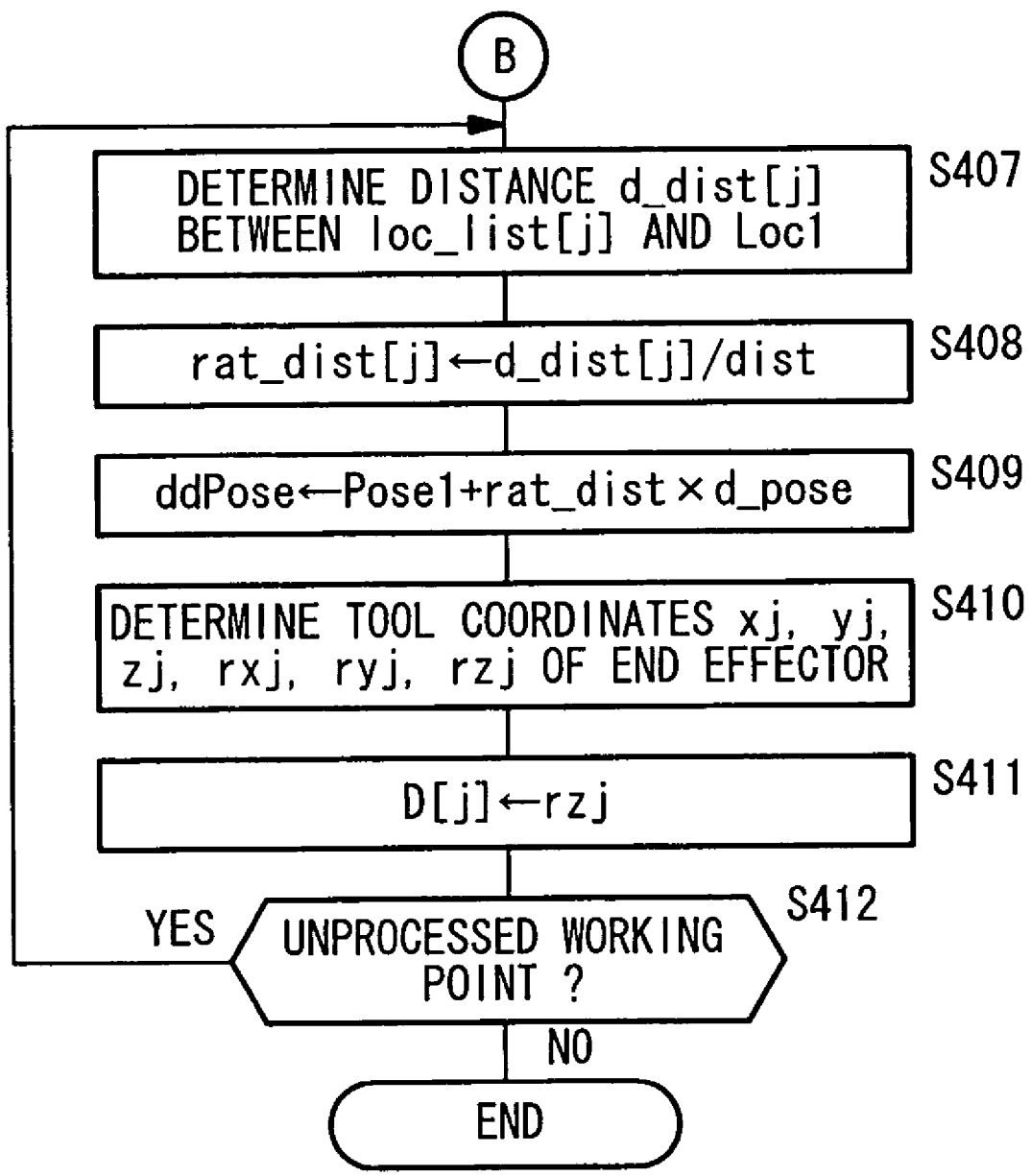
FIG. 16 is a flowchart (2) of the sequence for determining the second provisional attitude of the end effector according to the second generating method.

Then, in step S412, it is confirmed whether the second provisional attributes have been established for all the working points to be processed. If there is a working point not yet processed, then the counter j is incremented by [+1], after which control goes back to step S407 for continued processing. If all the working points to be processed have been processed, then the subroutine shown in FIGS. 15 and 16 is finished, and control returns to step S7 (see FIG. 7).

According to the second method of generating teaching data for the articulated robot 12, as described above, tool coordinate data of the end effector 22 are generated based on the proportionally divided attitude ddPose of the articulated robot 12 at the respective working points to be processed. Since the attitudes of the articulated robot 12 at the first working point P1 and the final working point Pe are established such that the articulated robot 12 can enter and return within a short time, by the entry direction determining template function and the return direction determining template function, the second generating method offers the same advantages as the first method described above.

A third generating method of smoothly moving the articulated robot 12 to shorten an operating time thereof will now be described below. According to the third generating method, the main routine, the entry direction determining template function, and the return direction determining template function are identical to those according to the first method. A process corresponding to step S6 shown in FIG. 7, i.e., a process of establishing second provisional attitudes of the end effector 22, will be described below with reference to FIGS. 17 through 19.

Figure 17:
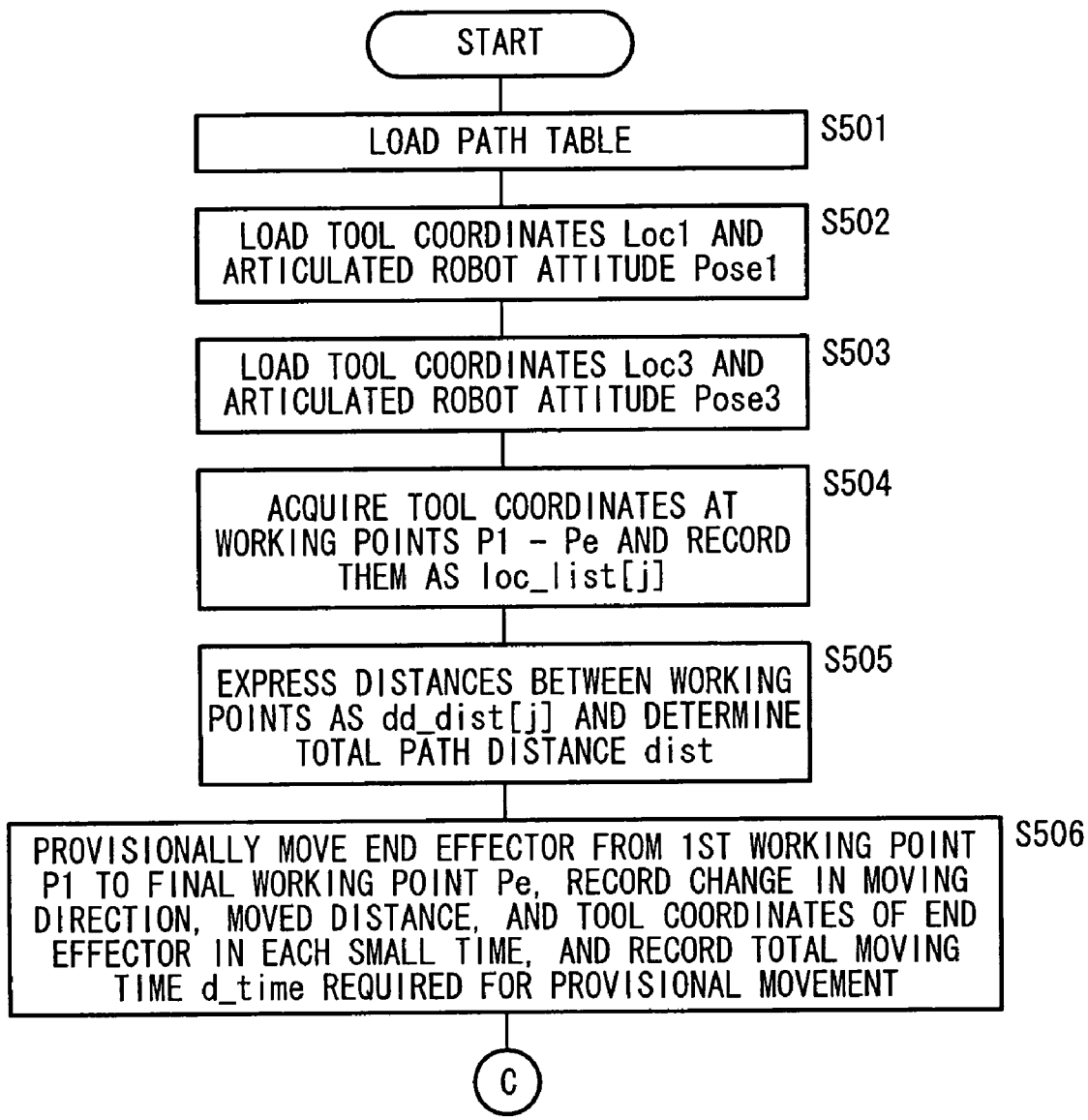
FIG. 17 is a flowchart (1) of a sequence for determining the second provisional attitude of the end effector according to a third generating method.

Steps S501 through S105 shown in FIG. 17 are the same as steps S301 through S305 described above.

After step S505, in step S506, the attitude of the articulated robot 12 is set to Pose1, and after the end effector 22 is moved to the first working point P1, the end effector 22 is provisionally moved to Pose3 corresponding to the final working point Pe.

According to the provisional movement, the function of the robot controller 24 is simulatively moved by the simulating circuit 44, and can smoothly be moved from the first working point P1 to the final working point Pe. The provisional movement may be made on the condition that the attitudes of the end effector 22 at the first working point P1 and the final working point Pe become the attitudes determined by the entry direction determining template function and the return direction determining template function, and an interim path may no necessarily need to pass through the working points P2, P3, etc. like a provisional path 102 shown in FIG. 19.

A method of movement can be selected. A movement may be selected to make the moving time shortest, or a movement may be selected to make the trajectory of the end effector 22 straight.

During the provisional movement, a change in the moving direction of the end effector 22, a moved distance thereof, and tool coordinate data of the end effector 22 are recorded in each given short time. A total moving time d_time required by the provisional movement is also recorded.

Steps S507, S508 are the same as steps S307, S308 described above. A distance ratio rat_dist[j] is determined in steps S507, S508.

Then, in step S509, a value produced by proportionally dividing the total moving time d_time by the distance ratio rat_dist[j], i.e., a proportionally divided time dd_time[j], is determined, as dd_time[j]←d_time×rat_dist[j].

Then, in step S510, time data corresponding to the proportionally divided time dd_time[j] is extracted from the data of the end effector 22 which was recorded in step S506. Furthermore, tool coordinate data (xj, yj, zj, rxj, ryj, rzj) of the end effector 22 is extracted as second provisional attitudes of the end effector 22 from the extracted data.

Figure 19:
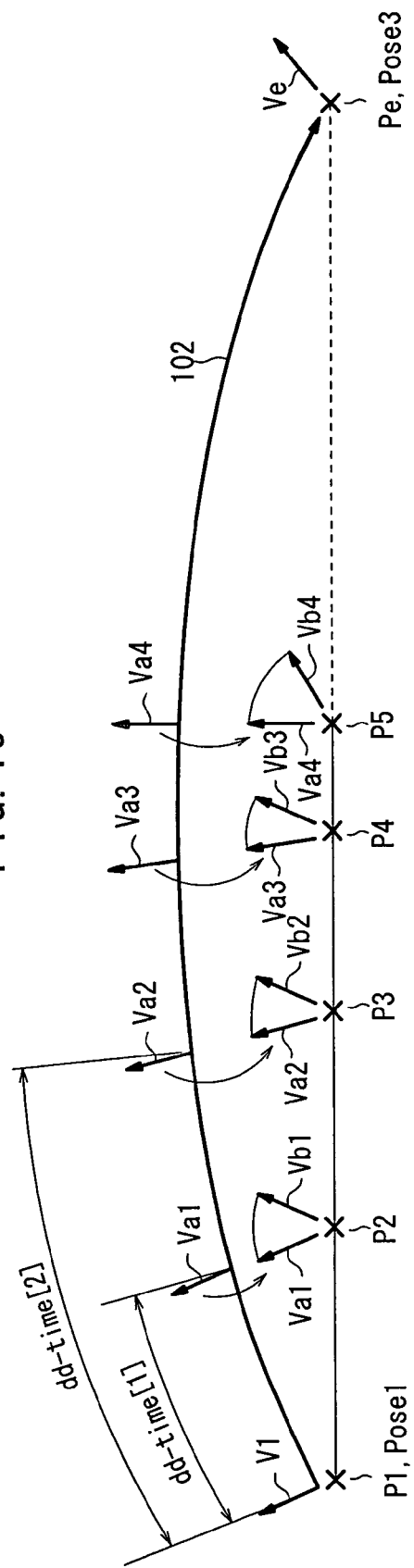
FIG. 19 is a diagram showing the relationship between a path of provisional movement according to the third generating method and working points.

The second provisional attitudes are conceptually represented as vectors Va1, Va2, Va3, Va4, . . . shown in FIG. 19.

Then, in step S511, rzj is selected and substituted as corrective data D[j] for correcting the first provisional attitudes.

Figure 18:
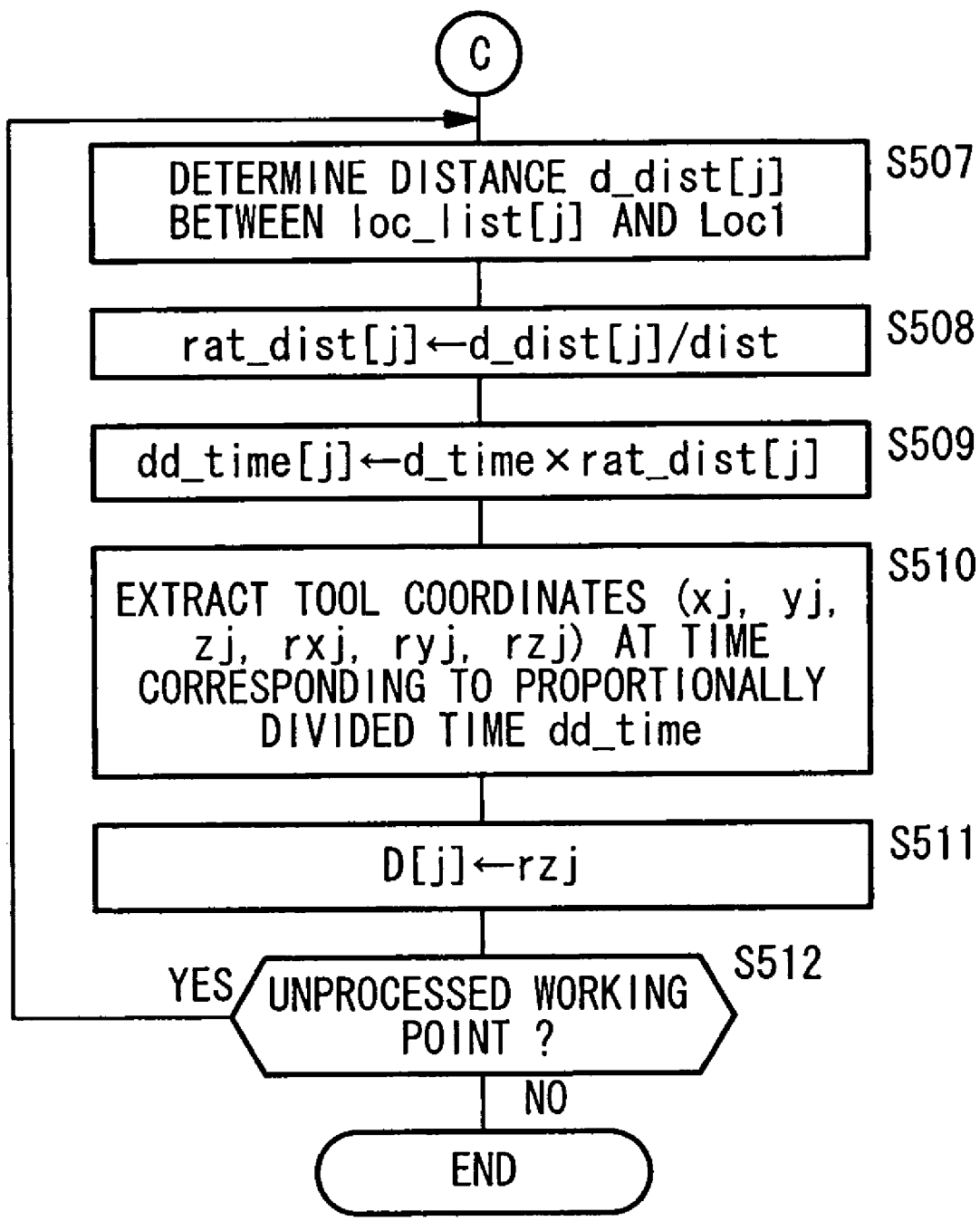
FIG. 18 is a flowchart (2) of the sequence for determining the second provisional attitude of the end effector according to the third generating method.

Then, in step S512, it is confirmed whether the corrective data D[j] has been established for all the working points to be processed. If there is a working point not yet processed, then the counter j is incremented by [+1], after which control goes back to step S507 for continued processing. If all the working points to be processed have been processed, then the subroutine shown in FIGS. 17 and 18 is finished, and control returns to step S7 (see FIG. 7).

According to the third generating method of generating teaching data for the articulated robot 12, conceptually, as shown in FIG. 19, after the end effector 22 is provisionally moved along the provisional path 102, the proportionally divided time dd_time[j] is determined by applying the distance ratios between the working points P1 through Pe to the total moving time d_time along the provisional path 102, and orientations of the end effector 22 at the corresponding points are extracted as the vectors Va1, Va2, Va3, . . . . When these vectors Va1, Va2, Va3, . . . are moved to the corresponding working points to be processed, vectors Vb1, Vb2, Vb3, Vb4, . . . representative of the first provisional attitudes are corrected.

According to the third generating method of generating teaching data for the articulated robot 12, as described above, the end effector 22 is simulatively moved between the first working point P1 and the final working point Pe, and tool coordinate data of the end effector 22 at the respective working points to be processed are established based on the attitudes of the end effector 22 which were recorded during the provisional movement. When the end effector 22 is simulatively moved smoothly and/or is moved in a short time, attitude changes of the end effector 22 between the working points P1 through Pe are made smooth, with the result that the end effector 22 can be moved smoothly between the working points P1 through Pe and in a short time. After the end effector 22 finishes its work at the final working point Pe, the end effector 22 can quickly be retracted from the final working point Pe, and can thus operate within a short time including a moving time after the end effector 22 finishes its work as a whole.

According to the third generating method, the proportionally divided time dd_time[j] is determined for processing by proportionally dividing the total moving time d_time for passing through the provisional path 102 by the distance ratio rat_dist[j]. However, the processing may be performed based on a point produced by proportionally dividing the total distance, rather than the proportionally divided time dd_time[j], of the provisional path 102 by the distance ratio rat_dist[j].

Though the distance ratio rat_dist[j] is determined from the positions of the working points P1 through Pe, the calculation of the distance ratio rat_dist[j] may be omitted and equally divided distances may be employed if the working points P1, P2, . . . , Pe are spaced at equal intervals.

An existing data utilizing method of utilizing the first teaching data 150 with respect to the vehicle 200 as an existing workpiece to establish the second teaching data 160 with respect to the vehicle 202 as another workpiece will be described below. First, general operation of the articulated robot 12 to which the existing data utilizing method is applied and teaching data for the articulated robot 12 will be described below.

Figure 20:
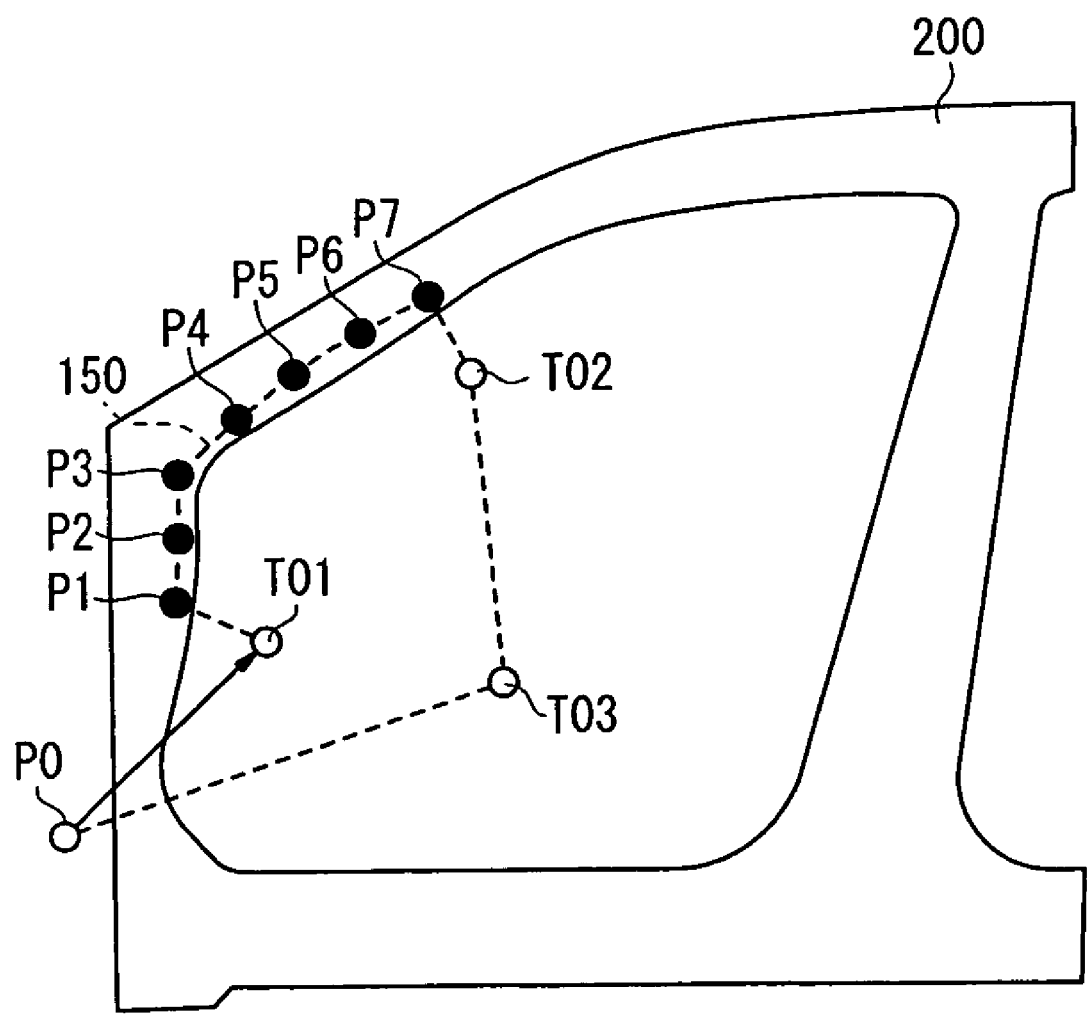
FIG. 20 is a side elevational view showing a working path based on first teaching data representative of movement of an articulated robot with respect to an existing workpiece.
Figure 21:
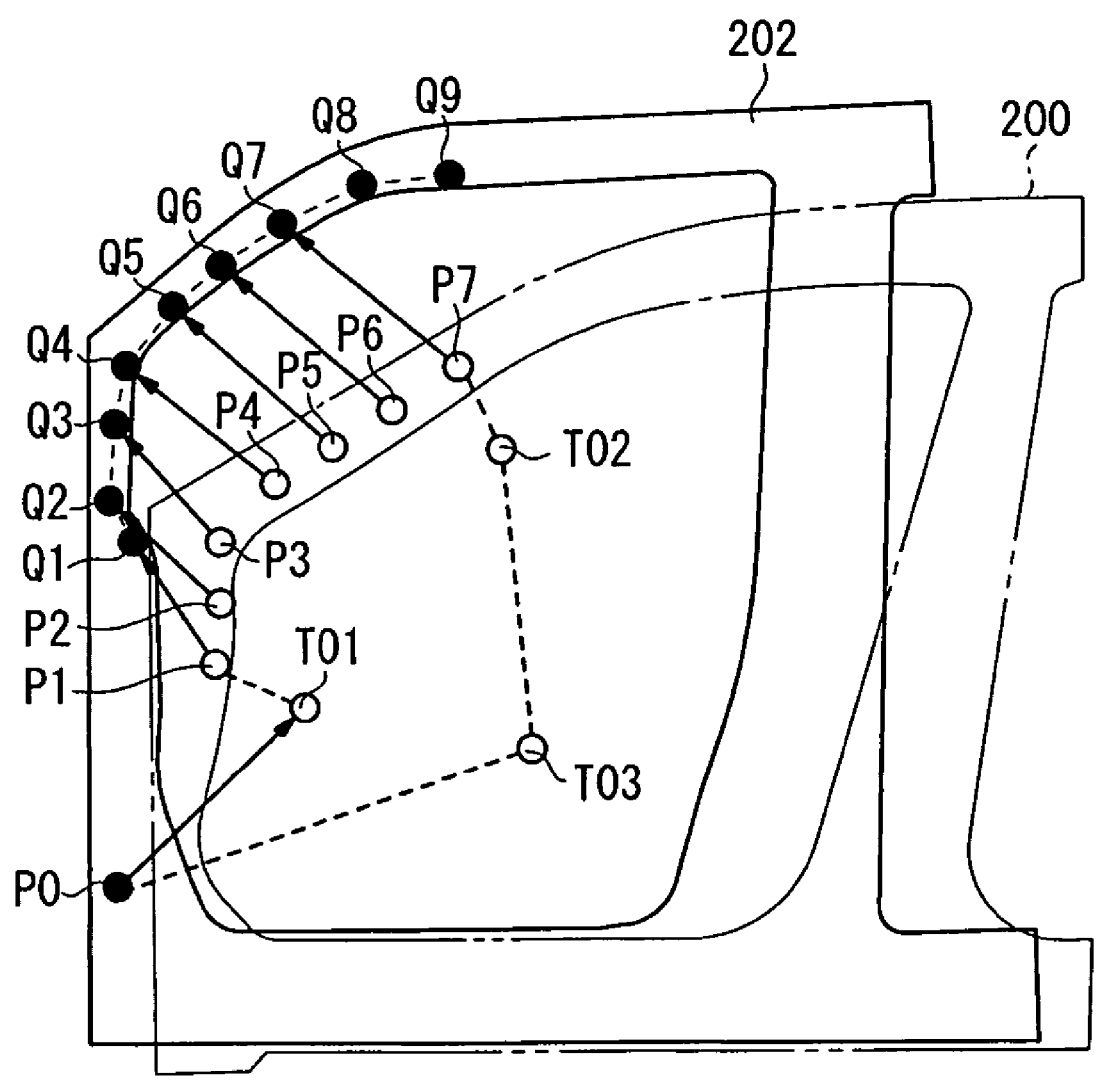
FIG. 21 is a side elevational view showing a working path based on second teaching data representative of movement of an articulated robot with respect to another workpiece.

Workpieces to be welded by the articulated robot 12 are a sedan-type vehicle (first workpiece) 200 shown in FIG. 20 and a wagon-type vehicle (second workpiece) 202 shown in FIG. 21. The sedan-type vehicle 200 is welded successively at seven working points P1 through P7 with the working origin P0 used as start and end points. Prior to arrival at the first working point P1, the end effector 22 passes through a provisional working point T01 representative of an attitude which allows the end effector 22 to reach the working point P1 easily. After the final working point P7, the end effector 22 passes through a provisional working point T02 representative of an attitude which allows the end effector 22 to be removed easily. The end effector 22 also passes through a provisional working point T03 which allows the end effector 22 to return from the provisional working point T02 to the working origin P0 easily.

Though not shown, working points through which the end effector 22 is to pass for entry into and removal from the above working points are disposed between the working points.

The first teaching data 150 representative of movement of the articulated robot 12 with respect to the sedan-type vehicle 200 comprises an "END EFFECTOR ORIENTATION" column, a "TCP POSITION" column, an "ENTRY DIRECTION" column, and an "EACH AXIS ANGLE" column, as shown in FIG. 22. The "END EFFECTOR ORIENTATION" column represents coordinates indicative of attitudes of the end effector 22, i.e., tool coordinate data, and contains the vectors Xr, Yr, Zr recorded therein. The "TCP POSITION" column contains recorded data representative of absolute coordinates of the end effector 22. The "ENTRY DIRECTION" column contains recorded vector data representative of directions in which the end effector 22 enters and is removed from the working points. The first teaching data 150 is conceptually expressed as a path including the seven working points P1 through P7, as shown in FIG. 20.

Figure 23:
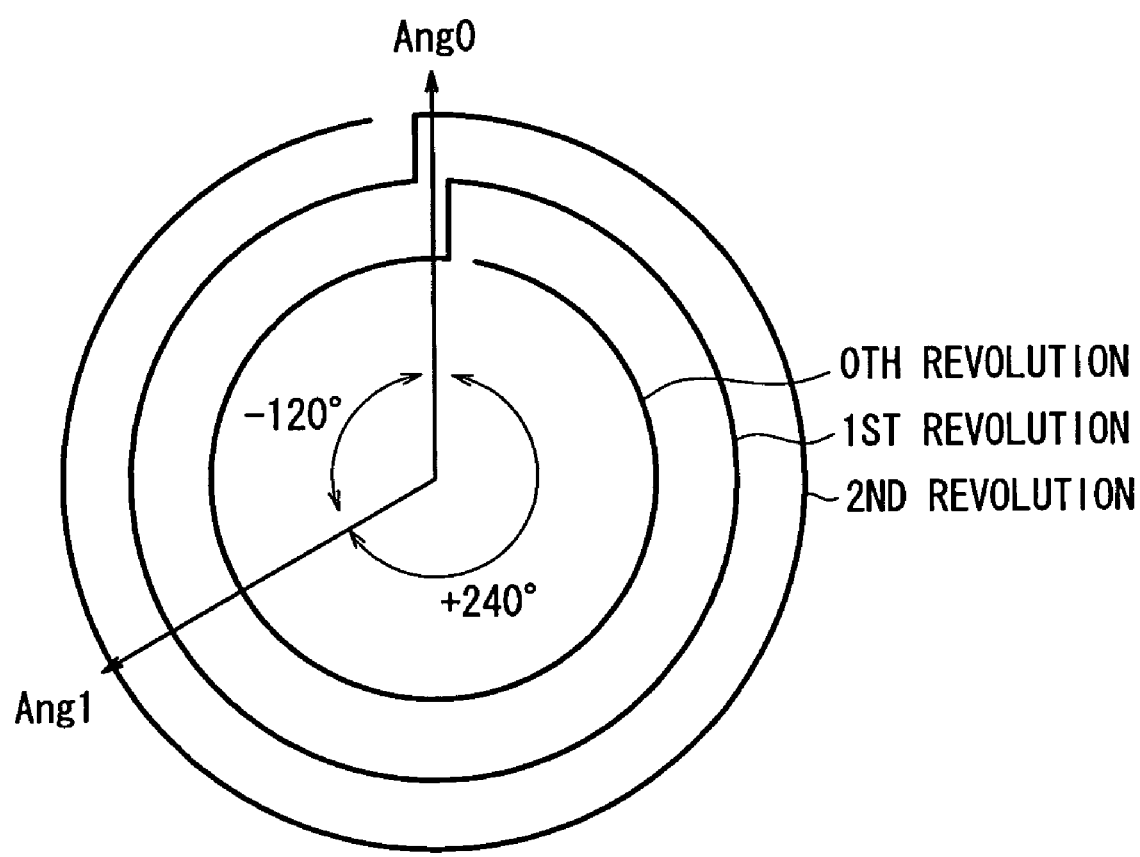
FIG. 23 is a diagram showing the relationship between rotational information and rotational angles.

The rotational angle θ4 corresponding to the axis J4 is associated with a "ROTATION" column indicative of revolutions. Similarly, the rotational angle θ6 corresponding to the axis J6 is associated with a "REVOLUTION" column indicative of revolutions. The "REVOLUTION" column contains either one of flag data (revolutionary information) "−1", "0", and "1". As shown in FIG. 23, the flag data "0" is set for 360° from a reference angle Ang0 as representing the first revolution, and the flag data "−1" is set for −360° from the reference angle Ang0 as representing the 0th revolution. The reference angle Ang0 can be changed. If the movable ranges of the axes J4, J6 are greater than those shown in FIG. 23, then flags may be added.

For example, when the rotational angle θ4 corresponding to the axis J4 is an Ang1 indicative of an apparent angle of 240°, if the data in the "REVOLUTION" column represents "0", it indicates an apparent angle of 240° on the first revolution, and if the data in the "REVOLUTION" column represents "1", then indicates an apparent angle of 240° on the second revolution.

By reading the flag data in the "REVOLUTION" column, it is possible to recognize which one of clockwise and counterclockwise directions the axis is to be rotated in. Specifically, when the axis is rotated clockwise from apparent 0° on the second revolution into an attitude of 240°, "1" is put in the "REVOLUTION" column. When the axis is rotated 120° counterclockwise, it gains an attitude of apparent 240° on the first revolution, and "0" is put in the "REVOLUTION" column. It is thus possible to recognize which direction the axis is rotated in. If the data in the "REVOLUTION" column is not taken into account, then various cables connected to the articulated robot 12 are unduly twisted depending on the direction in which the axes are rotated.

To reach apparent 240°, the axis may be rotated either counterclockwise 120° or clockwise 240°. If the cables are twisted by counterclockwise rotation, then the axis needs to be rotated clockwise through a larger angle while untwisting the cables. Based on the data in the "REVOLUTION" column, it is possible to operate the articulated robot 12 while properly removing a twist from the cables which cannot be judged simply from the magnitude of the rotational angle of the axis.

The first teaching data 150 contains data for preventing the cables from being twisted and also for preventing the axes J4, J6 from being rotated excessively between the working points. The first teaching data 150 is existing data and time-proven data which has actually be applied to the sedan-type vehicle 200.

Figure 28:
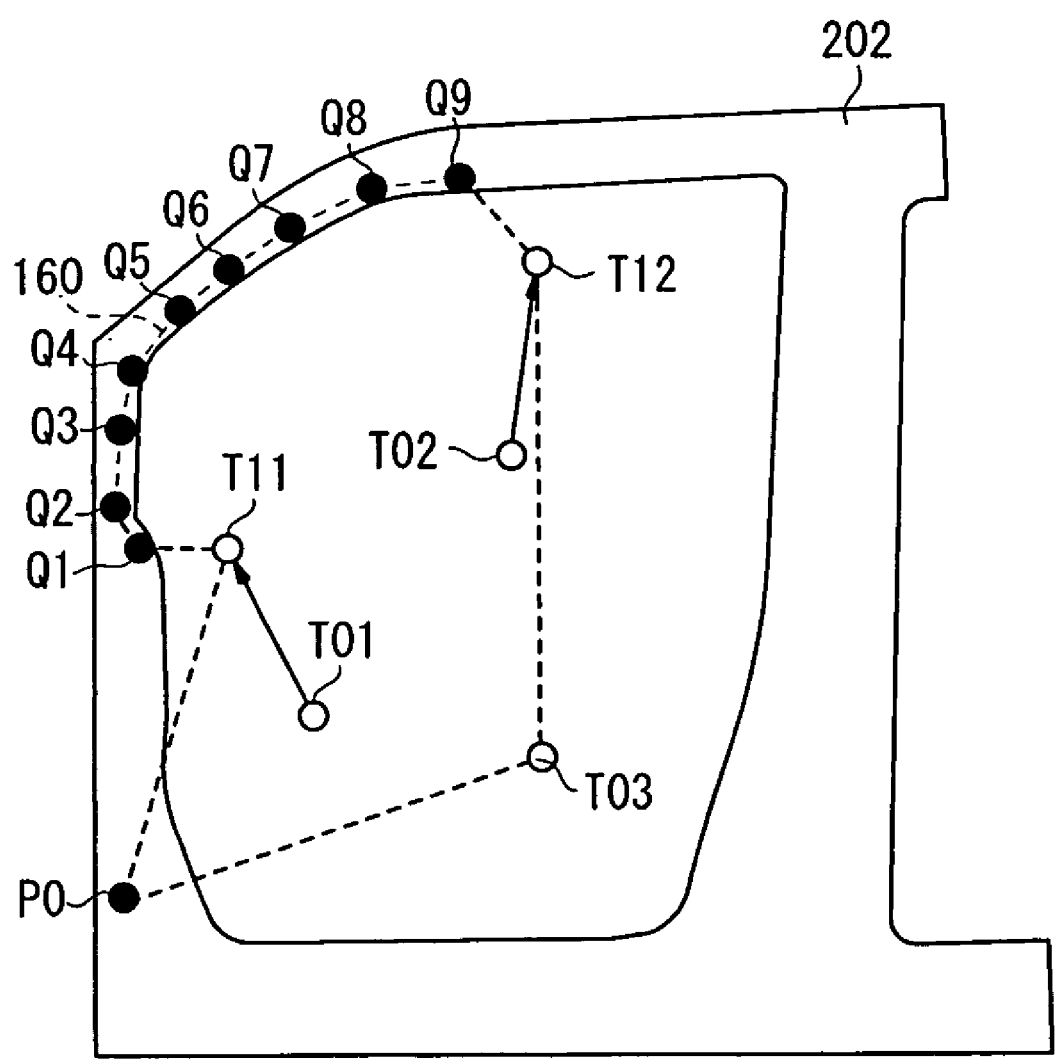
FIG. 28 is a side elevational view showing the manner in which data of entering and finishing areas are generated.

The articulated robot 12 also operates to weld the wagon-type vehicle 202 (see FIG. 21). For generating the second teaching data 160 (see FIG. 24) with respect o the vehicle 202, it is assumed that the first teaching data 150 already exists. It is preferable to utilize the first teaching data 150 for the generation of the second teaching data 160. However, since the shape of door frames of the vehicle 202 is different from the shape of door frames of the vehicle 200, the first teaching data 150 cannot directly be used as the second teaching data 160. The second teaching data 160 is conceptually expressed as a path including nine working points Q1 through Q9, as shown in FIG. 28.

Contents of working to be done on the vehicle 202 by the articulated robot 12, i.e., working contents represented by the second teaching data 160, are as follows: The wagon-type vehicle 202 is welded successively at the nine working points Q1 through Q9 with the working origin P0 used as start and end points. Prior to arrival at the first working point Q1, the end effector 22 passes through a provisional working point T11 representative of an attitude which allows the end effector 22 to reach the working point Q1 easily. After the final working point Q9, the end effector 22 passes through a provisional working point T12 representative of an attitude which allows the end effector 22 to be removed easily. Though not shown, working points through which the end effector 22 is to pass for entry into and removal from the above working points are disposed between the working points. The nine working points Q1 through Q9 are different in position and number from the working points P1 through P7 described above. However, they are commonly used as working points for door frames and are commonly welded successively upwardly.

Of the data corresponding to the nine working points Q1 through Q9 in the "TCP POSITION" column and the data corresponding to the nine working points Q1 through Q9 in the "END EFFECTOR ORIENTATION" column of the second teaching data 160, the data of the vector Zr is preset in the design stage of the vehicle 202. Therefore, in the second teaching data 160, data representing the vector Xr and the vector Yr in the "END EFFECTOR ORIENTATION" column, data in the "ENTRY DIRECTION" column, and data in the "EACH AXIS ANGLE" column may be established.

The first teaching data 150 and the second teaching data 160 are basically of the same structure as the path table 100 (see FIG. 6). The "TCP POSITION" column of the path table 100 represents coordinate values of three orthogonal axes. However, in FIG. 22 which shows the first teaching data 150 and FIG. 24 which shows the second teaching data, data in the "TCP POSITION" column is simply illustrated as A0, A2, . . . . The working positions P0 through P7 in the first through third generating methods for smoothly moving the articulated robot 12 to shorten a moving time thereof and the working positions P0 through P7 in the existing data utilizing method may not be of the same data.

Figure 25:
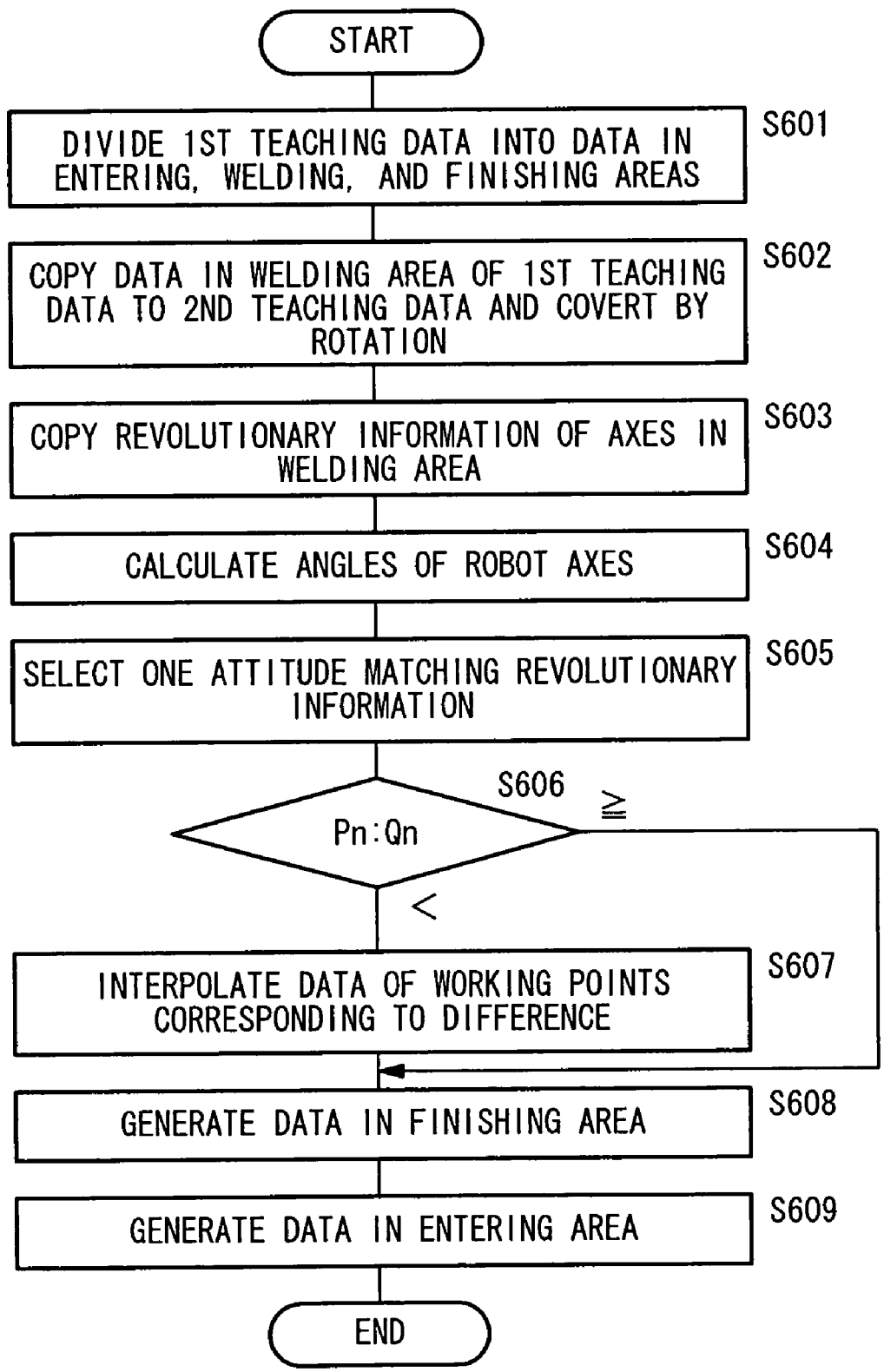
FIG. 25 is a flowchart of a sequence of a teaching data generating method for utilizing teaching data with respect an existing workpiece to establish teaching data with respect to another workpiece.

A detailed procedure of the existing data utilizing method will be described below with reference to a flowchart shown in FIG. 25.

Prior to the generation of the second teaching data 160, the teaching data generating program 56 is read from the hard disk 36 and loaded into the teaching data generating circuit 42. Then, the configurational data 58 with respect to the articulated robot 12, workpieces to be worked, and other pieces of equipment, and the robot specification data 60 indicative of maximum speeds, maximum accelerations, movable ranges, etc. of the respective axes of the articulated robot 12, are read from the hard disk 36. The graphic control circuit 48 displays images of the articulated robot 12, a workpiece to be welded, and pieces of equipment including jigs on the display 46 based on the configurational data 58.

After the above preparatory process, the teaching data generating circuit 42 reads the first teaching data 150, and divides the first teaching data 150 into data of an entering area, data of a welding area, and data of a finishing area in step S601.

The data of the entering area is data indicative of a path from the working origin P0 to the first working point P1. The data of the welding area is data indicative of a path from the first working point P1 to the final working point P7. The data of the finishing area is data indicative of a path from the final working point P7 to the working origin P0. In the example shown in FIG. 22, therefore, the data of the entering area is represented by sequence number 1 to sequence number 2, the data of the welding area by sequence number 2 to sequence number 8, and data of the finishing area by sequence number 8 to sequence number 10.

Then, in step S602, data in the "END EFFECTOR ORIENTATION" column in the welding area of the first teaching data 150 is copied and converted by rotation to the "END EFFECTOR ORIENTATION" column of the second teaching data 160.

Figure 26:
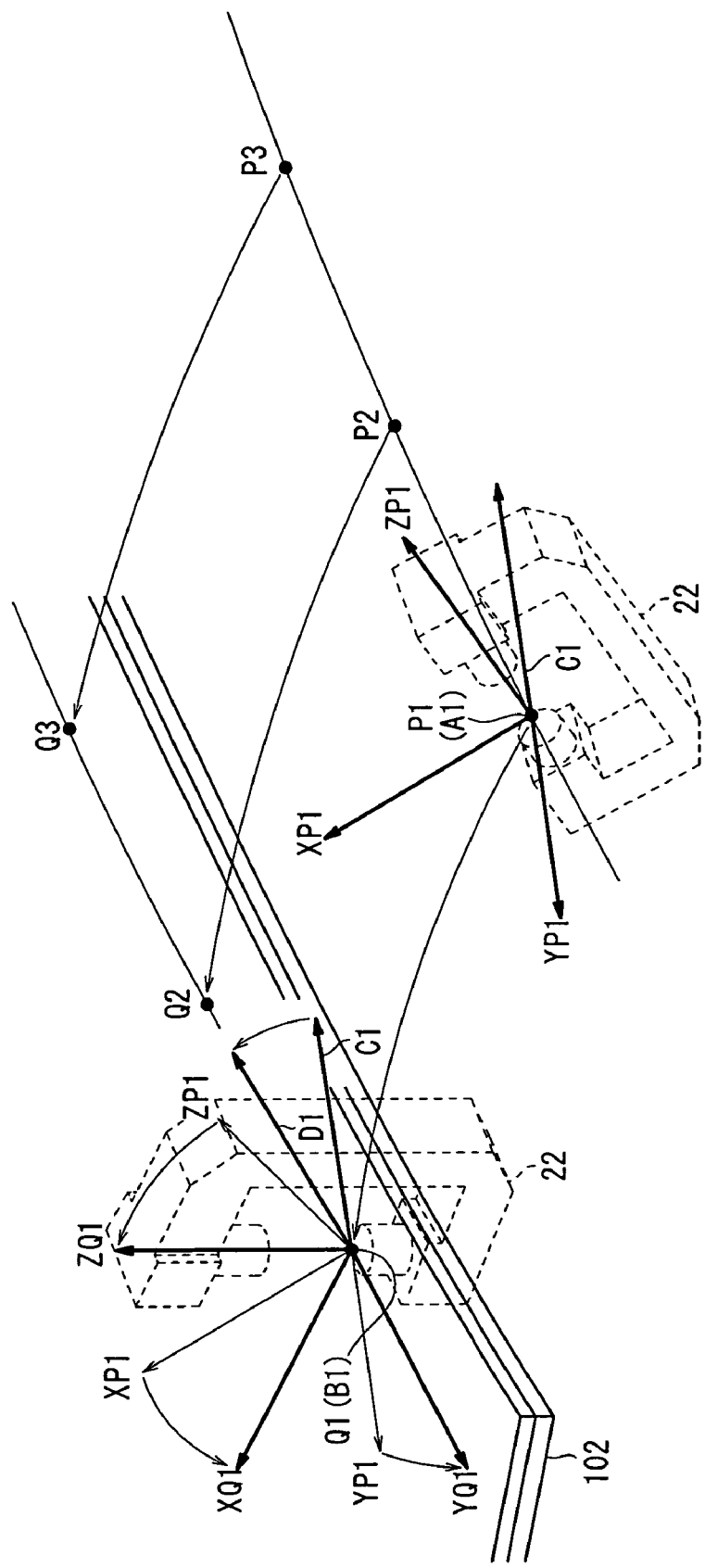
FIG. 26 is a perspective view showing the manner in which data of a welded area is copied and converted from the first teaching data to the second teaching data.

Specifically, for copying the data of the first working point P1 to the working point Q1 (see FIG. 26), vectors XP1, YP1, ZP1 of the first teaching data 150 are moved parallel to B1 representative of the position of the working point Q1, after which the vector ZP1 is converted by rotation to match a preset vector ZQ1. The vectors XP1, YP1 are also converted by rotation into respective vectors XQ1, YQ1. A vector C1 indicative of an entry direction is also converted by rotation into a vector D1. The data of the working points P2 through P7 are similarly copied and converted by rotation to the working points Q2 through Q7.

Then, in step S603, the data in the "REVOLUTION" column in the welding area of the first teaching data 150 is copied. In this manner, when the articulated robot 12 is operated according to the second teaching data 160, the cables of the articulated robot 12 are prevented from being twisted, and the axes J4, J6 are prevented from being excessively rotated between the working points.

Then, in step S604, angles of the axes J1 through J6 of the articulated robot 12 are calculated by an inverse conversion process using a determinant based on the data in the "END EFFECTOR ORIENTATION" column and the data in the "TCP POSITION" column. According to this process, a plurality of attitudes of the articulated robot 12 may be determined.

Then, in step S605, one of the determined attitudes of the articulated robot 12 which matches the data in the "REVOLUTION" column is selected. Since angles θQ11, θQ21, θQ31, θQ41, θQ51, and θQ61 corresponding to the angles θ1 through θ6 are determined with respect to the working point Q1, they are recorded in the respective columns of the angles θ1 through θ6 in the "EACH AXIS ANGLE" column.

In this manner, the data in the welding area of the second teaching data 160 is determined based on the first teaching data 150.

Then, in step S606, the number Pn of working positions of the first teaching data 150 and the number Qn of working positions of the second teaching data 160 are compared with each other. If the number Qn (9) of the working positions Q1 through Q9 of the second teaching data 160 is greater than the number Pn (7) of the working positions P1 through P7 of the first teaching data 150 as in the examples shown in FIGS. 22 and 24, then control goes to step S607. If the number Pn is equal to or smaller than the number Qn, then control goes to step S608.

Figure 27:
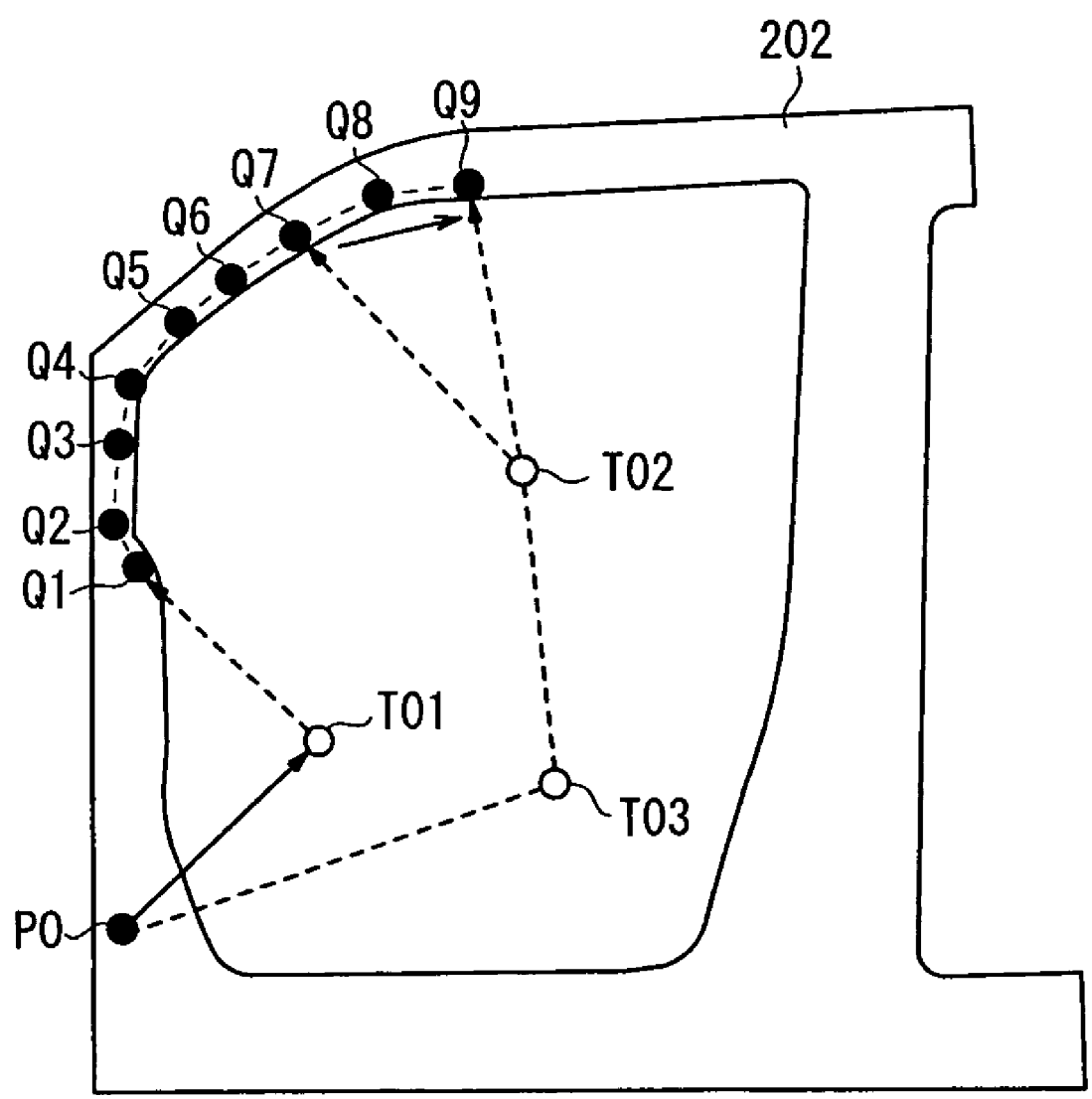
FIG. 27 is a side elevational view showing the manner in which data of working points of differences are interpolated.

In step S607, i.e., if the number Qn of the working positions of the second teaching data is greater than the number Pn of the working positions of the first teaching data 150, then the data of the working points corresponding to the difference is interpolated according to a given process (see FIG. 27). The procedure may be performed according to the method disclosed in Japanese Laid-Open Patent Publication No. 2003-117864.

Then, in step S608, data in the finishing area is generated based on the tool coordinate data of the final working point (e.g., the working point Q9) (see FIG. 28). The data in the finishing area should allow the end effector 22 to be easily removed in a short moving time after the welding process at the final working point is finished. Alternatively, a portion of the data in the finishing area of the first teaching data 150 may directly be used as the data in the finishing area of the second teaching data 160. For example, the 10th data T03 (see FIG. 22) of the first teaching data 150 is used as the 12th data T03 (see FIG. 24) of the second teaching data 160.

Then, in step S609, data in the entering area, i.e., a provisional working point T11, is generated based on the tool coordinate data at the first working point P1 (see FIG. 28). The data in the entering area should allow the end effector 22 to easily enter the first working point P1 in a short moving time. Alternatively, a portion of the data in the entering area of the first teaching data 150 may directly be used as the data in the entering area of the second teaching data 160.

By thus generating the second teaching data 160, it is possible to effectively utilize the first teaching data 150 for the vehicle 200 to efficiently generate the second teaching data 160 even if the vehicle 202 as a new workpiece is of a shape different from the vehicle 200 as an existing workpiece.

Because the second teaching data 160 directly uses the data in the "REVOLUTION" column of the first teaching data, when the articulated robot 12 welds the vehicle 202 based on the second teaching data 160, the cables connected to the articulated robot 12 are prevented from being twisted, and the axes J4, J6 are prevented from being excessively rotated between adjacent ones of the working points.

The data D1 through D7 in the "ENTRY DIRECTION" column which represent directions in which the end effector 22 enters and is removed from the working points Q1 through Q7 can easily be established based on the data C1 through C7 in the "ENTRY DIRECTION" column at the working points P1 through P7 of the first teaching data 150.

The generated second teaching data 160 is confirmed for operation by the simulating circuit 44 and recorded into the external recording medium 38 through the recording medium drive 40. Then, the teaching data recorded in the external recording medium 38 is downloaded into the robot controller 24 for controlling the articulated robot 12.

Figure 29:
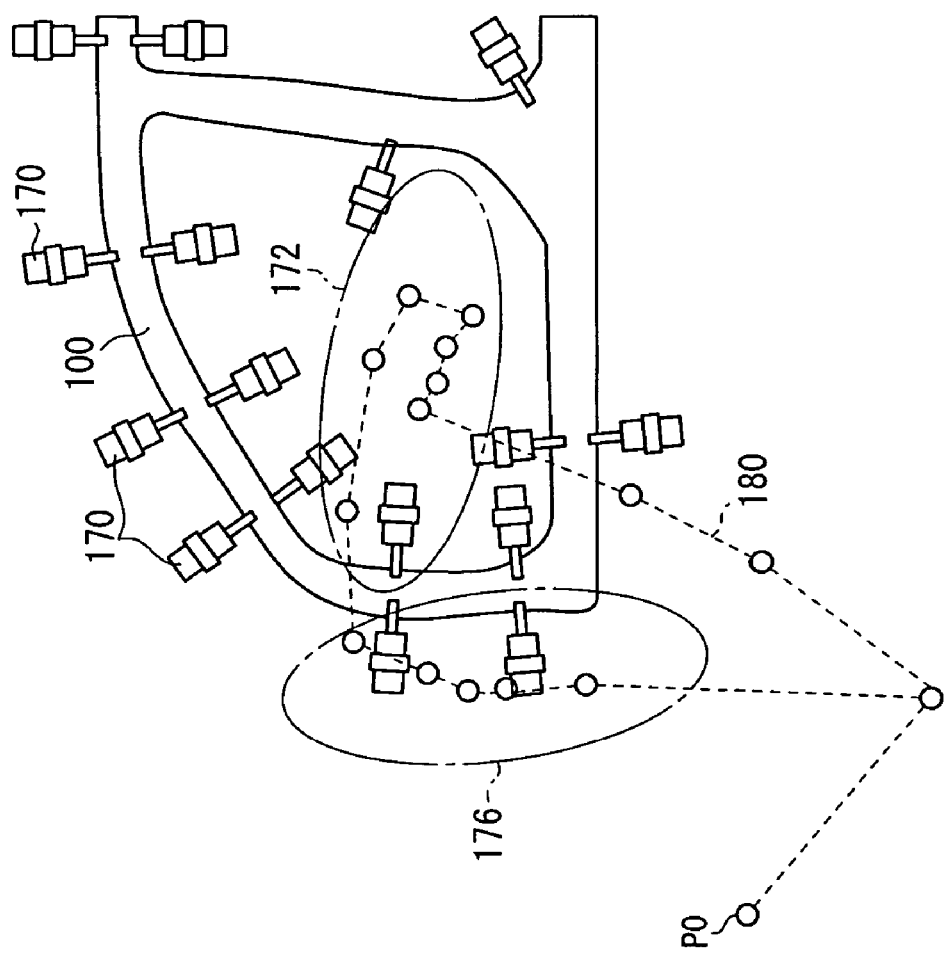
FIG. 29 is a side elevational view showing a working path based on the first teaching data representative of movement of an articulated robot with respect to an existing workpiece with jigs mounted thereon.
Figure 30:
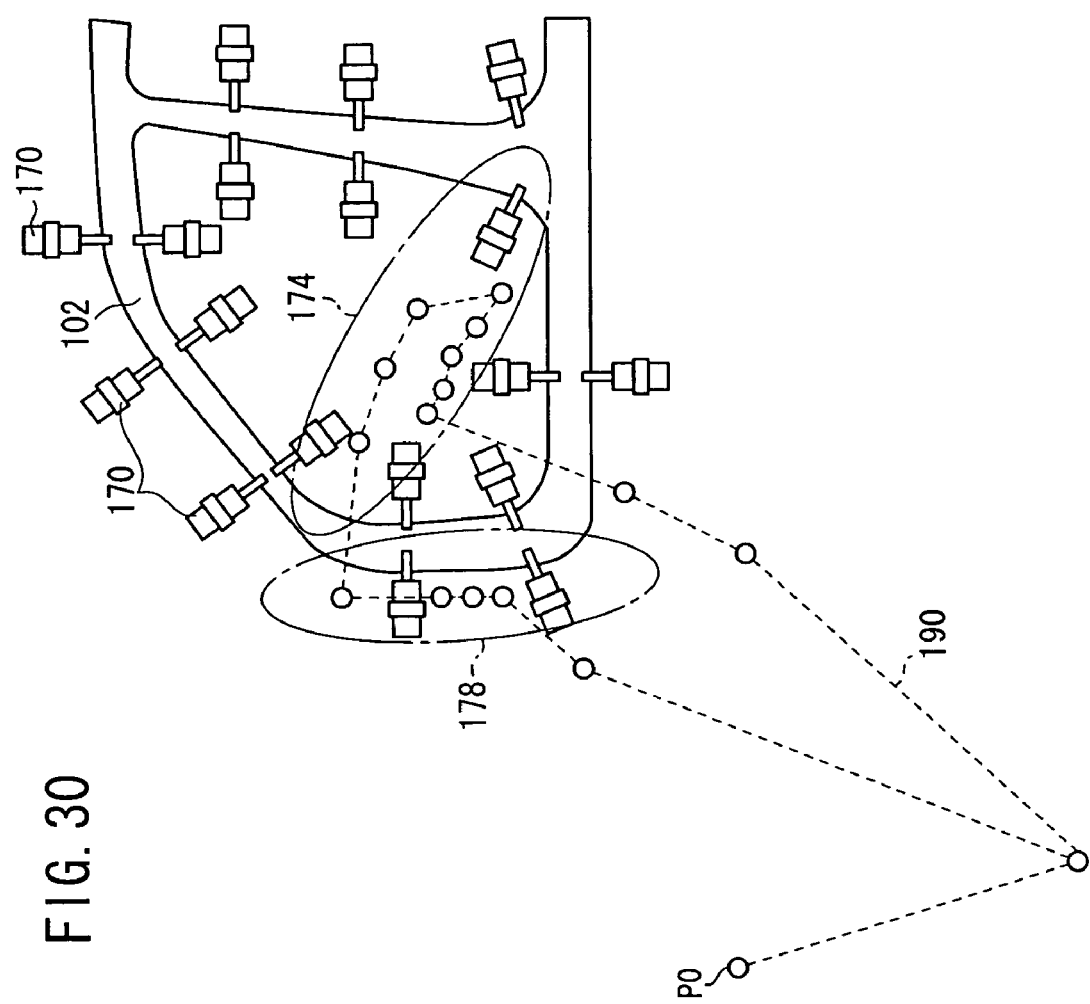
FIG. 30 is a side elevational view showing a working path based on the second teaching data representative of movement of an articulated robot with respect to another workpiece with jigs mounted thereon.

The existing data utilizing method has been described above with respect to the generation of the second teaching data 160 which is data for the door frames of the vehicle 202. Actually, however, as shown in FIGS. 29 and 30, jigs 170 may be mounted on the vehicles 200, 202, requiring more complex teaching. In this case, jig-compatible first teaching data 180 applied to the vehicle 200 may be used as jig-compatible second teaching data 190 applied to the vehicle 202. Specifically, of the jig-compatible first teaching data 180, teaching data in a slightly obliquely crossing area 172 of the vehicle 200 may be applied to teaching data of the jig-compatible second teaching data 190 in a substantially similar area 174 of the vehicle 202. Furthermore, teaching data in a vertical moving area 176 of the vehicle 200 may be applied to teaching data in a substantially similar area 178.

If the tool coordinate data of the first teaching data 150, 180 are converted by rotation into the tool coordinate data of the second teaching data 160, 190, then the storage unit such as the RAM 32 or the like may be used in any of various ways. Specifically, the tool coordinate data of the first teaching data 150, 180 may be converted by rotation in their storage areas and rewritten, and thereafter may be transferred to the storage areas of the second teaching data 160, 190. Conversely, the tool coordinate data of the first teaching data 150, 180 may be converted by rotation after they are transferred to the storage areas of the second teaching data 160, 190. Alternatively, the tool coordinate data of the first teaching data 150, 180 may be copied to a given buffer area, converted by rotation in the buffer area, and thereafter transferred to the storage areas of the second teaching data 160, 190.

The invention claimed is:

1. A method of generating teaching data for an articulated robot, which has an end effector, for successively working on a plurality of successive working points with said end effector, comprising:

the first step of establishing first provisional attitudes of said end effector with respect to said working points;

the second step of determining an attitude of said articulated robot at a first working point at an end of said working points;

the third step of determining an attitude of said articulated robot at a final working point at the other end of said working points;

the fourth step of establishing second provisional attitudes of said end effector with respect to other working points such that the attitude of the end effector of said articulated robot which is determined in said second step changes progressively to the attitude of the end effector of said articulated robot which is determined in said third step;

the fifth step of correcting said first provisional attitudes with said second provisional attitudes to establish attitudes of said end effector of said articulated robot at the respective working points.

2. A method of generating teaching data for an articulated robot according to claim 1, wherein said second step determines the attitude of said articulated robot at said first working point in order for the end effector to reach said first working point within a shortest time from a teaching spot preceding said first working point.

3. A method of generating teaching data for an articulated robot according to claim 1, wherein said third step determines the attitude of said articulated robot at said final working point in order for the end effector to reach a teaching spot following said final working point within a shortest time from said final working point.

4. A method of generating teaching data for an articulated robot according to claim 1, wherein said fourth step comprises:

a first substep of determining a difference between the attitudes of the end effector of said articulated robot which are determined respectively in said second step and said third step; and a second substep of establishing the second provisional attitudes by proportionally dividing the attitudes of the end effector of said articulated robot which are determined respectively in said second step and said third step, by a distance ratio of each of the working points from said first working point to a total path distance from said first working point to said final working point.

5. A method of generating teaching data for an articulated robot according to claim 1, wherein said fourth step comprises:

a first substep of determining a difference between the attitudes of the end effector of said articulated robot which are determined respectively in said second step and said third step;

a second substep of determining a proportionally divided attitude by proportionally dividing the attitudes of the end effector of said articulated robot which are determined respectively in said second step and said third step, by a distance ratio of each of the working points from said first working point to a total path distance from said first working point to said final working point; and a third substep of determining the attitudes of said end effector at said proportionally divided attitude as said second provisional attitudes.

6. A method of generating teaching data for an articulated robot according to claim 1, wherein said fourth step comprises:

a first substep of recording the attitudes of said end effector at respective predetermined times while simulatively moving said end effector from said first working point to said final working point on the condition that the attitudes of said end effector at said first working point and said final working point become the attitudes determined respectively in said second step and said third step; and a second substep of selecting attitudes, which correspond to a moving time ratio, of the attitudes of said end effector recorded in said first sub step, based on a distance ratio of each of the working points from said first working point to a total path distance from said first working point to said final working point.

7. A method of generating teaching data for an articulated robot according to claim 6, wherein when said end effector is simulatively moved in said first sub step, said end effector is moved in a shortest time from said first working point to said final working point.

8. A method of generating teaching data for an articulated robot according to claim 6, wherein when said end effector is simulatively moved in said first sub step, said end effector is moved straight from said first working point to said final working point.

9. A method of generating teaching data for an articulated robot according to claim 1, wherein said fifth step replaces at least one of a plurality of parameters representing said first provisional attitudes with parameters representing said second provisional attitudes.

10. A method of generating teaching data for an articulated robot according to claim 1, wherein said first step establishes said first provisional attitudes such that working members of said end effector perpendicularly face a workpiece; and said fifth step corrects said first provisional attitudes to keep said working members perpendicularly facing said workpiece.

11. A method of generating teaching data for an articulated robot to convert first teaching data for said articulated robot which correspond to a plurality of working points on a first workpiece into second teaching data for said articulated robot which correspond to a plurality of working points on a second workpiece, wherein said first teaching data and said second teaching data include tool coordinate data representing attitudes of an end effector of said articulated robot at said working points, said tool coordinate data comprising a plurality of parameters; and one of the parameters of the tool coordinate data of said second teaching data is established in advance, and the step of converting the tool coordinate data of said first teaching data into the tool coordinate data of said second teaching data so that one of the parameters of the tool coordinate data of said first teaching data matches the one established parameter of said second teaching data, is performed on said working points, and said second teaching data is supplied to said articulated robot.

12. A method of generating teaching data for an articulated robot according to claim 11, wherein said first teaching data and said second teaching data include entry direction data with respect to said working points, said entry direction data being copied from said first teaching data into said second teaching data at each of said working points.

13. A method of generating teaching data for an articulated robot according to claim 11, wherein said first teaching data and said second teaching data include revolutionary information relative to a rotational angle of at least one joint at each of said working point, said revolutionary information being copied from said first teaching data into said second teaching data at each of said working points.

14. A method of generating teaching data for an articulated robot according to claim 11, wherein said second teaching data includes first provisional working point data representative of a provisional point preceding a first working point of said working points and second provisional working point data representative of a provisional point following a final working point of said working points, said first provisional working point data being established based on tool coordinate data at said first working point, and said second provisional working point data being established based on tool coordinate data at said final working point.

* * * * *